United States Patent
Matsuoka

(10) Patent No.: US 8,561,959 B2
(45) Date of Patent: Oct. 22, 2013

(54) VIEWING OBJECT RETENTION DEVICE

(75) Inventor: Norimichi Matsuoka, Kumamoto (JP)

(73) Assignee: Fujimiyaseisakusho Co., Ltd., Kumamoto (JP)

(*) Notice: Subject to any disclaimer, the term of this patent is extended or adjusted under 35 U.S.C. 154(b) by 0 days.

(21) Appl. No.: 13/820,883

(22) PCT Filed: Sep. 5, 2011

(86) PCT No.: PCT/JP2011/070128
§ 371 (c)(1),
(2), (4) Date: Mar. 5, 2013

(87) PCT Pub. No.: WO2012/033038
PCT Pub. Date: Mar. 15, 2012

(65) Prior Publication Data
US 2013/0161454 A1    Jun. 27, 2013

(30) Foreign Application Priority Data

Sep. 8, 2010 (JP) ................. 2010-201284
May 19, 2011 (JP) ................. 2011-112769
Aug. 26, 2011 (JP) ................. 2011-184505

(51) Int. Cl.
*A47B 23/04* (2006.01)

(52) U.S. Cl.
USPC ............. 248/447.1; 248/133; 248/445; 5/658

(58) Field of Classification Search
USPC ................ 5/85.1, 87.1, 658; 248/444.1, 445, 248/447.1, 454, 441.1, 133, 183.4
See application file for complete search history.

(56) References Cited

U.S. PATENT DOCUMENTS

| | | | | |
|---|---|---|---|---|
| 2,638,701 A * | 5/1953 | Dahlgren | ............ | 248/445 |
| 4,531,813 A * | 7/1985 | Van den Berg | ............ | 359/862 |
| 5,112,021 A * | 5/1992 | Greene | ............ | 248/444.1 |
| 5,480,212 A * | 1/1996 | Marconet | ............ | 297/188.01 |
| 5,592,153 A * | 1/1997 | Welling et al. | ............ | 248/278.1 |
| 6,742,755 B2 * | 6/2004 | Pryor | ............ | 248/447 |
| 8,408,504 B1 * | 4/2013 | Gonzales | ............ | 248/158 |
| 2001/0035486 A1 * | 11/2001 | Pryor | ............ | 248/441.1 |
| 2003/0019038 A1 * | 1/2003 | Welling et al. | ............ | 5/503.1 |

FOREIGN PATENT DOCUMENTS

| | | |
|---|---|---|
| JP | 05-108013 A | 4/1993 |
| JP | 2005-084671 A | 3/2005 |
| JP | 2005-195711 A | 7/2005 |
| JP | 2007-199099 A | 8/2007 |
| JP | 2007-329659 A | 12/2007 |
| JP | 2008-186005 A | 8/2008 |
| JP | 2008-298806 A | 12/2008 |
| JP | 2009-047890 A | 3/2009 |

* cited by examiner

*Primary Examiner* — Bradley Duckworth
(74) *Attorney, Agent, or Firm* — Steger PLC

(57) ABSTRACT

A viewing object retention device allows a viewing object to be arranged at an optimum position and enables an angle of the object to be adjusted so as to accord with a direction of a face of a viewer. The device includes a fixed base part, an arm part one end portion of which is turnably joined to the base part, and the other end portion of which extends along an axis line from this joining point toward a space above the viewer, a viewing object retention part located at the other end portion of the arm part to retain the object and a revolving mechanism that displaces the retention part angularly to the axis line with the turning of the arm part with the joining point.

17 Claims, 34 Drawing Sheets

(a)      (b)

VIEWING OBJECT RETENTION DEVICE

TECHNICAL FIELD

The present invention relates to a retention device to retain a viewing object such as an image display device and a reading material, and particularly to a retention device that enables a viewer to comfortably view a viewing object in a state where he or she lies down.

BACKGROUND ART

In recent years, particularly at hospitals, care sites or the like, there has been increased a demand to comfortably view an image display device such as a liquid crystal display in a position lying on a bed or in a futon, or in a position sitting in a wheelchair or the like. As a device that responds to the above-described demand, for example, as disclosed in JP 2005-84671 A (Patent Literature 1), a retention device to retain the image display device as a viewing object vertically above a lying viewer has been conventionally developed.

CITATION LIST

Patent Literature
    Patent Literature 1: JP 2005-84671 A

SUMMARY OF INVENTION

Technical Problem

The retention device described in Patent Literature 1 exemplified in the foregoing is a device that retains the image display device so that the image display device as the viewing object can be viewed comfortably even when the viewer changes his or her position from a supine state to a state lying on his or her side. However, in the retention device described in Patent Literature 1, there is a problem that when the viewer views the image display device in the position lying on his or her side, a burden is placed on the viewer. This will be described with reference to FIGS. 39 to 41.

FIG. 39 is an external view when a state where a viewer A is viewing an image display device 103 in a supine position, using a retention device 101 described in Patent Literature 1 is seen from a head top portion side and a right side of the viewer A. FIG. 40 is an external view showing a state where the retention device 101 shown in FIG. 39 is turned by substantially 90° toward a left side of the viewer A through a turning shaft 104, and the viewer A is viewing the image display device 103 in a position lying on his or her left side. FIG. 41 is an external view when the state shown in FIG. 40 is seen from vertically upper side of the viewer A, that is, when it is seen from arrow XLI in FIG. 40.

Referring to FIGS. 39 to 41, the retention device 101 described in Patent Literature 1 has an L-shaped arm part 102 that is attached with the image display device 103 at one end thereof, and is turnably joined to a base part 105 through the turning shaft 104 at the other end thereof. The turning shaft 104 is provided on the base 105 along a direction where a body of the viewer A lies down, and the arm part 102 can be turned in right and left directions of the viewer A, centering on the turning shaft 104. Accordingly, when the viewer A enters the use state in the position lying on his or her left side as shown in FIGS. 40 and 41 from the use state in the supine position shown in FIG. 39, the image display device 103 is also retained by a retention mechanism 102 in a state lying on its side so as to accord with a direction of a face of the viewer A, which is inclined almost horizontally. This enables the image display device 103 to be viewed relatively comfortably.

However, in this case, as shown in FIGS. 40 and 41, the image display device 103 is away from a head portion of the viewer A by a distance $d_0$ in a front direction of the viewer. That is, according to the retention device 101 described in Patent Literature 1, when the viewer A enters the use state of the position lying on his or her side from the use state of the supine position, the viewer A needs to correct the position lying on his or her side so as to direct the head portion to the image display device 103 in order to view the image display device 103. Changing the position in this manner is a large burden on a physically-challenged person or an elderly person.

In light of the above-described problem in the related art, the inventor of the present application has been tackling development of a retention device that can constantly retain an image display device at an optimum viewing position regardless of a body direction of a lying viewer. As a result, a prototype of the retention device as shown in FIGS. 42 and 43 has been developed. This will be briefly described below. FIG. 42 is an external view when a state where the viewer A is viewing an image display device 113 in a supine position, using a retention device 111 is seen from the right side of the viewer A. FIG. 43 is an external view showing a state where the retention device 111 shown in FIG. 42 is turned by substantially 90° toward the left side of the viewer A through a turning shaft 114, and the viewer A is viewing the image display device 113 in the position lying on his or her left side, corresponding to FIG. 42.

Referring to FIGS. 42 and 43, the retention device 111 is provided with a base part 115 including the turning shaft 114 integrally provided at an upper end portion thereof so as to be inclined at an angle $\theta_0$ with respect to a horizontal direction, and fixed to the head top portion side of the viewer A, and an arm part 112 that is turnably joined to the base part 115 through the turning shaft 114 at one end thereof and retains the image display device 113 at the other end thereof. In the retention device 111, the arm part 112 extending so as to be inclined at an angle $(90-\theta_0)°$ with respect to the horizontal direction can be turned in the right and left directions of the viewer A, centering on an axis line 116 of the turning shaft 114. With this configuration, when the viewer A enters the use state of the position lying on his or her side shown in FIG. 43 from the use state of the supine position shown in FIG. 42, the image display device 113 can be arranged in front of the face of the viewer in the position lying on his or her side. That is, this retention device 111 does not force the viewer to correct the position when he or she uses the device in the position lying on his or her side, which is different from the retention device described in Patent Literature 1. Here, the inventor of the present application pays attention to the following problem occurring in the retention device 111 having the above-described configuration in a development process of the retention device 111.

When the retention device 111 is used in the position lying on the viewer's side, as shown in FIG. 43, the image display device 113 is retained in the state inclined at the angle $(90-\theta_0)°$ from the horizontal direction. However, when the viewer A views the image display device 113 in front of a sight line of the viewer A in the position lying on his or her side, in terms of easiness of the viewing for the viewer A, it is preferable that the image display device 113 is retained in the state almost lying on its side. That is, it is preferable that the angle $(90-\theta_0)°$ in FIG. 43 is substantially 90°. Accordingly, if the viewer A tries to view the image display device 113 more comfortably, work of manually turning the image display device 113 shown in FIG. 43 by the angle $\theta_0$ counterclockwise when seen from the viewer is necessary. Considering a case where the device is applied to a physically-challenged person or an elderly person, the configuration requiring the above-described work is not preferable, because a burden placed on the viewer is large.

Moreover, in recent years, there has been increased a demand not only to view the above-described image display device but also to comfortably read a reading material such as a book and a magazine in a lying position.

Consequently, in light of the above-described problem, an object of the present invention is to provide a viewing object retention device that retains a viewing object to enable a viewer to view the viewing object while lying down, wherein a viewing object can be always arranged at an optimum viewing position regardless of a direction of a body of a lying viewer, and an angle of the viewing object can be adjusted so as to accord with a direction of a face of the viewer.

Solution to Problem

A viewing object retention device according to the present invention is a retention device to retain a viewing object to enable a viewer to view the viewing object such as an image display device, a reading material or the like in a lying position or in a sitting position. The viewing object retention device includes a fixed base part, an arm part that is turnably joined to the base part at one end portion thereof, and extends to the other end portion along an axis line from this joining point toward a space above the viewer, a viewing object retention part that is located at the other end portion of the arm part to retain the viewing object, and a revolving mechanism that displaces the viewing object retention part angularly with respect to the axis line with the turning of the arm part with the joining point used as a fulcrum.

As a first embodiment, this revolving mechanism turns the viewing object retention part counterclockwise when seen from the viewer when the arm part turns in a left direction of the viewer, and turns the viewing object retention part clockwise when seen from the viewer when the arm part turns in a right direction of the viewer.

According to this configuration, as the arm part is being turned in the left direction of the viewer from the state where the viewing object is retained by the viewing object retention device immediately above the viewer in a vertical direction, and the viewer is viewing the viewing object in a supine position, the viewing object retention part, that is, the viewing object is turning counterclockwise when seen from the viewer in conjunction with the turning of the arm part. Moreover, as the arm part is being turned in the right direction of the viewer, the viewing object is turning clockwise when seen from the viewer in conjunction with the turning of the arm part. Thereby, the viewing object can be arranged at an optimum viewing position by turning the arm part, whether the viewer lies on his or her right or left side, and the above-described revolving mechanism can revolve the viewing object in conjunction with the turning of the arm part to automatically adjust an angle of the viewing object when seen from the viewer so as to accord with a direction of a face of the viewer. Accordingly, the viewer can view the viewing object comfortably by an extremely easy operation regardless of the direction of a lying body.

The revolving mechanism may revolve the viewing object retention part around the axis line with the turning of the arm part.

Preferably, the revolving mechanism has a first abutting member provided in the base part, and a second abutting member that is provided in the arm part and abuts on the first abutting member relatively revolvably, and revolves the viewing object retention part around the axis line through the first abutting member and the second abutting member with the turning of the arm part.

More preferably, the first abutting member comprises a first bevel gear firmly provided in the base part, and the second abutting member comprises a second bevel gear firmly provided in the arm part so as to be engaged with the first bevel gear. According to this configuration, by the second bevel gear moving on the first bevel gear while being engaged with the first bevel gear with the turning of the arm part, the arm part itself rotates with respect to the axis line of the arm part. Thereby, the angle of the viewing object when seen from the viewer can be automatically adjusted so as to accord with the direction of the face of the viewer with the turning of the arm part. Moreover, since the revolving mechanism can be realized with a simple configuration using the two bevel gears, a manufacturing cost can be reduced.

More preferably, if an angle of the arm part with respect to a horizontal direction is $\theta_A$, the number of teeth of the first gear is $G_1$, and a number of teeth of the second bevel gear is $G_2$, $(90°-\theta_A)/90° \approx G_1/G_2$ is satisfied. According to this configuration, when the arm part is turned by 90° in either of the left and right directions, and the viewer views the viewing object, lying on his or her side, the viewing object is arranged substantially in front of the viewer in a state almost lying on its side so as to accord with the direction of the face of the viewer which almost horizontally lies on its side. This enables the viewer to comfortably view the viewing object, even when he or she views the viewing object in the position lying on his or her side.

Preferably, the viewing object retention part is revolvably supported at the arm part, the revolving mechanism has a joining member that joins a fixed point on the base part and a movable point at a predetermined position on the viewing object retention part, and the revolving mechanism turns the viewing object retention part through the joining member with the turning of the arm part. According to this configuration, in accordance with a difference in a relative distance between the fixed point on the base part and the movable point on the viewing object retention part, which difference is caused with the turning of the arm part, the joining member having a constant length that joins these points allows the viewing object retention part to be turned. This allows the angle of the viewing object when seen from the viewer to be automatically adjusted so as to accord with the direction of the face of the viewer in conjunction with the turning of the arm part. Moreover, since the revolving mechanism can be realized by the simple configuration made of the joining member that joins the fixed point as well as these points, the manufacturing cost can be reduced.

Preferably, the revolving mechanism has a fixed member fixed to the base part, a revolving member provided in the viewing object retention part, and the joining member tightly stretched relatively unmovably between the fixed member and the revolving member.

More preferably, the fixed member and the revolving member are circular, and the joining member is tightly stretched around outer circumferential surfaces of the fixed member and the revolving member. According to this configuration, since the revolving mechanism can be realized by the fixed member and the revolving member, and the joining member tightly stretched between these, the structure of the revolving mechanism can be made simple. Accordingly, the viewing object retention device can be manufactured more easily. Moreover, a revolution angle of the revolving member caused in conjunction with the turning of the arm part can be easily adjusted by a diameter ratio between the fixed member and the revolving member. Furthermore, balances in lengths of the arm part and the viewing object retention part, the diameter ratio between the fixed member and the revolving member, and weights of the respective components are designed appropriately, by which regardless of a weight of the supported viewing object, moments acting on the arm part can be balanced by utilizing tension of the joining member tightly stretched between the fixed member and the revolving member. This enables the user to turn the arm part by a relatively small force, and to cause the arm part to stand still at an arbitrary position.

More preferably, if an angle of the arm part with respect to the horizontal direction is $\theta_A$, a diameter of the fixed member is $R_1$, and a diameter of the revolving member is $R_2$, $(90°-\theta_A)/90° \approx R_1/R_2$ is satisfied. According to this configuration, when the arm part is turned by 90° in either of the left and right directions and the viewer views the viewing object, lying on his or her side, the viewing object is arranged substantially in front of the viewer in a state almost lying on its side so as to accord with the direction of the face of the viewer which almost horizontally lies on its side. This enables the viewer to comfortably view the viewing object, even when he or she views the viewing object in the position lying on his or her side.

Preferably, the viewing object retention part is turnably supported at the arm part, the revolving mechanism further has arm part turning means for electrically turning the arm part, viewing object retention part turning means for electrically turning the viewing object retention part, and control means for controlling the arm part turning means and the viewing object retention part turning means so that the viewing object retention part turns with the turning of the arm part. According to this configuration, the turning of the arm part, and the turning of the viewing object in conjunction of the turning of the arm part can be all controlled electrically. This, for example, enables all the operation of the arm part to be controlled remotely. Accordingly, the operation of the viewing object retention device can be made easier.

Preferably, an angle between the viewing object retention part and the axis line of the arm part is set to a range of 80° to 100°. More preferably, the arm part extends from the joining point toward the space above the viewer at an angle ranging 40° to 70° with respect to a horizontal direction. According to this configuration, the viewing object can be arranged at a position where it is easier for the viewer to view.

As a second embodiment, the revolving mechanism changes an included angle between the axis line and the viewing object retention part with the turning of the arm part. For example, this revolving mechanism is configured such that as the arm part is being turned to either of the right and left directions of the viewer from the position immediately above the viewer in the vertical direction, the included angle is increased. According to this configuration, as the arm part is being turned to either of the right and left directions of the viewer from the state where he or she is viewing the viewing object retained on the upper front side when seen from the viewer in the supine position, a position in a front-rear direction of the viewing object is gradually approaching a position in the front-rear direction of a head portion of the viewer. That is, in the state where the arm part is turned by substantially 90° from the vertical direction, the positions in the front-rear direction of the viewing object and the head portion of the viewer coincide with each other, so that the viewing object can be arranged substantially in front of the sight line of the viewer lying on his or her side, facing the viewing object. Accordingly, the viewer can view the viewing object comfortably by the extremely easy operation regardless of the direction of the lying body.

Preferably, the revolving mechanism further has a guide member including a guide groove that receives a part of the viewing object retention part to control the included angle with the turning of the arm part. According to this configuration, the viewing object retention part relatively slides inside the guide groove, and the included angle is appropriately controlled, so that the viewing object is arranged substantially in front of the sight line of the lying viewer. Accordingly, the viewer can view the viewing object comfortably by the easy operation regardless of the direction of the lying body. Moreover, since the revolving mechanism that brings about the above-described effect can be realized by the above-described simple configuration, the manufacturing cost can be reduced.

Preferably, an elastic member that exerts an elastic force in accordance with the turning displacement of the arm part on the arm part or the viewing object retention part is further included. According to this configuration, stillness of the arm part at an arbitrary turning angle can be effectively assisted.

More preferably, the elastic member is provided on the viewing object retention part side, and exerts the elastic force on the viewing object retention part in accordance with the angle displacement of the viewing object retention part with respect to the axis line, the displacement being caused with the turning of the arm part.

Advantageous Effects of Invention

According to the present invention, the viewing object can be arranged at an optimum viewing position by turning the arm part, whether the viewer lies on his or her right or left side, and the above-described revolving mechanism can revolve the viewing object in conjunction with the turning of the arm part to automatically adjust the angle of the viewing object when seen from the viewer so as to accord with the direction of the face of the viewer. Accordingly, the viewer can view the viewing object comfortably by the extremely easy operation regardless of the direction of the lying body.

DESCRIPTION OF EMBODIMENTS

Figure 1:
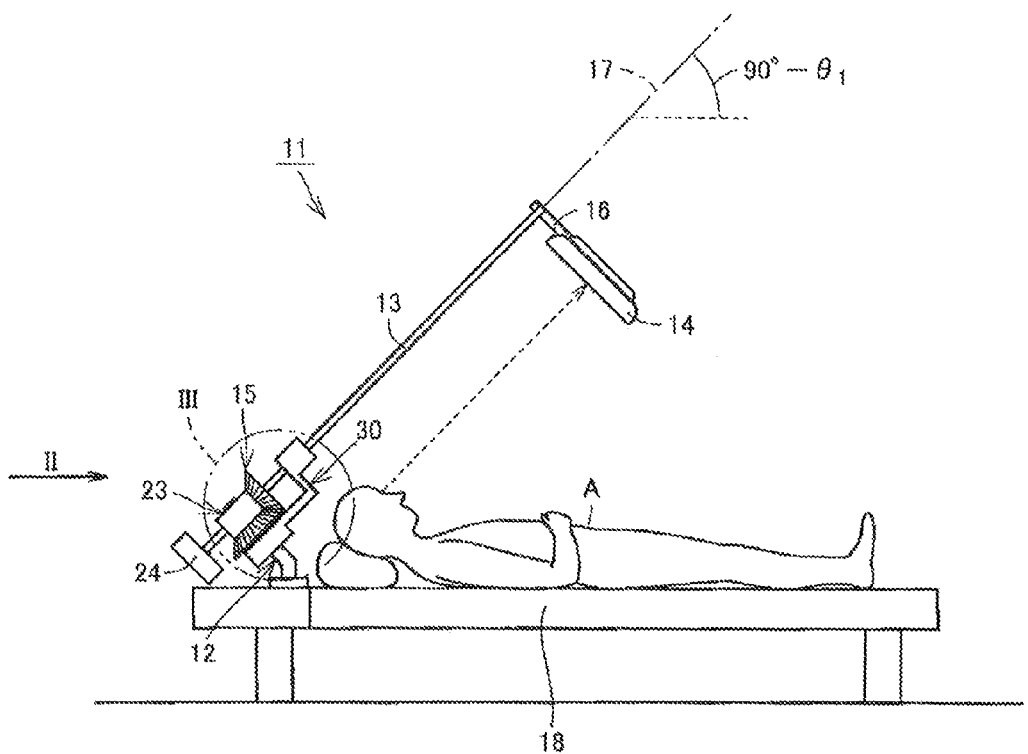
FIG. 1 is an external view when a state where a viewer is viewing a viewing object in a supine position, using a viewing object retention device according to one embodiment of the present invention, is seen from a right side of the viewer.
Figure 2:
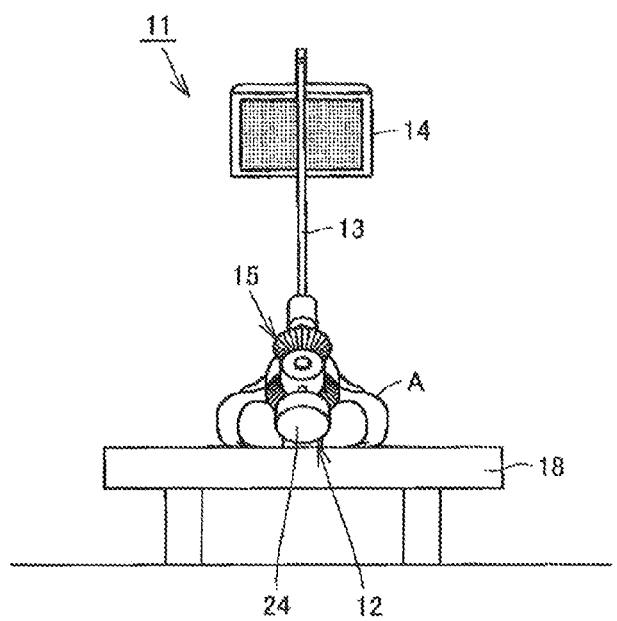
FIG. 2 is an external view when the state shown in FIG. 1 is seen from arrow II in FIG. 1.
Figure 3:
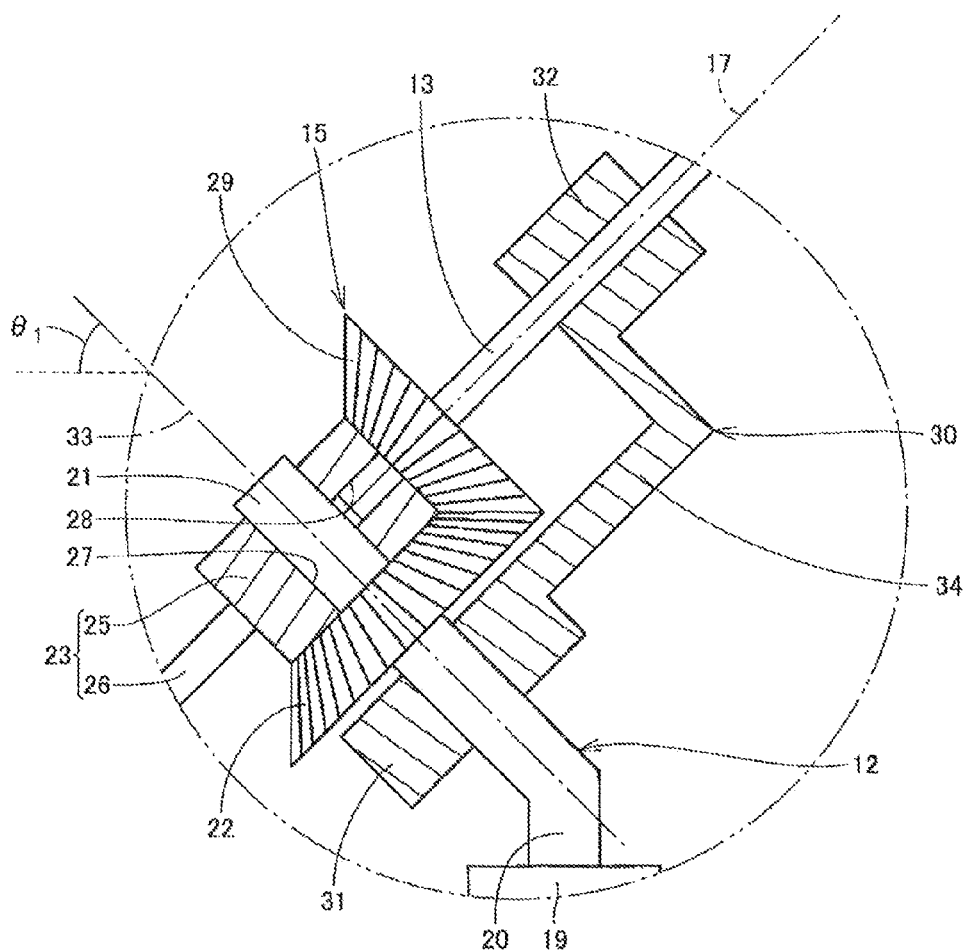
FIG. 3 is a cross-sectional enlarged view in which a region III in FIG. 1 is enlarged and a part thereof is shown in a cross section.

Hereinafter, embodiments of the present invention will be described in detail with reference to the drawings. First, with reference to FIGS. 1 to 3, a configuration of a viewing object retention device 11 according to one embodiment of the present invention will be described. FIG. 1 is an external view when a state where a viewer A is viewing a viewing object 14 in a supine position, using the viewing object retention device 11 according to one embodiment of the present invention, is seen from a right side of the viewer A. FIG. 2 is an external view when the state shown in FIG. 1 is seen from a head top portion side of the viewer A, that is, from arrow II in FIG. 1. FIG. 3 is a cross-sectional enlarged view in which a region III in FIG. 1 is enlarged and a part thereof is shown in a cross section. In the following description, an upper direction refers to a vertically upper direction, that is, an upper direction on paper space in FIG. 1, and a left direction refers to a left direction when seen from the viewer A, that is, a back direction of the paper space in FIG. 1, and a front direction refers to a right direction of the paper space in FIG. 1.

Referring to FIGS. 1 to 3, the viewing object retention device 11 according to one embodiment of the present invention is a retention device that retains the viewing object 14 in order to enable the viewer A to comfortably view the viewing object 14, lying on a bed 18. The viewing object retention device 11 is provided with a base part 12 fixed to the head top portion side of the lying viewer A, an arm part 13 that is turnably joined to the base part 12 at a rear end thereof and retains the viewing object 14 at a front end thereof, and a revolving mechanism 15 to displace an angle of the viewing object 14 with the turning of the arm part 13.

The base part 12 has a pedestal part 19 fixed to an upper surface of the bed 18 on the head top portion side of the viewer A, a base rod 20 extending vertically upward from an upper surface of the pedestal part 19, and a circular turning shaft rod 21 extending so as to be inclined from an upper end of the base rod 20 to an upper rear side. The turning shaft rod 21 extends from the upper end of the base rod 20 to an upper rear direction so as to be inclined at an angle $\theta_1$ with respect to a horizontal direction. Moreover, at a central part of the turning shaft rod 21, a base-side bevel gear 22 described later is firmly provided integrally so that a tooth portion is arranged on an upper side.

The arm part 13 is turnably joined to an upper end portion of the turning shaft rod 21, and extends straight in an upper front direction from a joining point to the base part 12. In the present embodiment, the arm part 13 is made of a rod member extending straight. Accordingly, an axis line 17 of the arm part 13 similarly extends in the upper front direction from the joining point to the base part 12 to form a straight line to a space vertically above the viewer A. Preferably, the arm part 13 is made of a material having a high rigidity such as metal, glass-fiber reinforced resin, and a carbon-fiber reinforced resin. Moreover, at a rear end portion of the arm part 13, an arm-side bevel gear 29 described later is firmly provided so as to be engaged with the base-side bevel gear 22.

In the present embodiment, the revolving mechanism 15 is made up of the arm-side bevel gear 29 firmly provided in the arm part 13, and the base-side bevel gear 22 firmly provided in the turning shaft rod 21. This revolving mechanism 15 is configured so as to enable the viewing object 14 to revolve in conjunction with the turning of the arm part 13. This operation will be described later.

At the front end of the arm part 13, a viewing object retention part 16 to detachably retain the viewing object 14 is fixed. The viewing object retention part 16 is configured so as to be fixed to the arm part 13 at substantially 90° with respect to the extending direction of the arm part 13, that is, the axis line 17 to detachably retain the viewing object 14 at a lower end portion thereof. The viewing object retention part 16 may be configured so as to be joined to the arm part 13 turnably in a front-rear direction along the axis line 17 with a joining point to the arm part 13 used as a fulcrum. The above-described configuration enables an inclination angle of the viewing object 14 when seen from the viewer A to be adjusted. Moreover, while the viewing object retention part 16 is desirably fixed to the arm part 13 at substantially 90° with respect to the axis line 17 of the arm part 13, it may be fixed at an angle ranging 80° to 100° with respect to the axis line 17 of the arm part 13. This range of the angle allows the viewer to comfortably view the viewing object. This will be described later.

The viewing object retention device 11 according to the present embodiment is further provided with a balancer supporting part 23 attached to an upper end portion of the base part 12, and a balancer 24 attached to a rear end of the balancer supporting part 23. The balancer supporting part 23 includes a toric ring part 25 having the upper end portion of the turning shaft rod 21 inserted therein, and a rod member 26 provided integrally with the ring part 25 and extending rearward from the ring part 25. At the center of the ring part 25, a circular through-hole 27 is provided, so that the turning shaft rod 21 is inserted into this through-hole 27. Moreover, at a front portion of the ring part 25, a through-hole 28 for receiving the arm part provided so as to penetrate in the front-rear direction is further provided. The rear end portion of the arm part 13 is inserted into this through-hole 28. A front end of the rod member 26 is integrally joined to the ring part 25, and a rear end thereof supports the balancer 24. The balancer 24 is a weight made of metal having a predetermined weight, which is attached to provide a balance of a gravitational moment to the viewing object retention device 11. This will be described later.

The arm part 13 is supported by the balancer supporting part 23 turnably with the turning shaft rod 21 used as a fulcrum, and the arm part 13 and the viewing object 14, and the balancer 24 are connected mechanically. The arm part 13 is joined to the base part 12 by the balancer supporting part 23 at substantially 90° with respect to an axis line 33 of the turning shaft rod 21. That is, the arm part 13 is supported so as to be inclined at substantially $(90-\theta_1)°$ with respect to the horizontal direction.

Here, generally, when the viewer lies on a bed or in a futon, he or she often uses a pillow, as shown in FIG. 1. As a result of earnest consideration, the inventor of the present application has found that in the state where the pillow is used, an angle where the viewing object 14 is easiest to view, when the viewer A views the viewing object 14 retained on the upper front side of the viewer A is substantially 30° to 55° from the horizontal. Accordingly, an inclination angle of the arm part 13 with respect to the horizontal direction is desirably substantially 40° to 70°. This will be described later.

The viewing object retention device 11 is further provided with a support member 30 to support the joining between the base part 12 and the arm part 13. The support member 30 includes an annular part 31 into which the turning shaft rod 21 is inserted, an annular part 32 into which the arm part 13 is inserted, and a joining part 34 joining the annular parts 31 and 32. Since this support member 30 allows the arm part 13 to be turnably supported stably by the base part 12, the arm part 13 can be turned more stably with the turning shaft rod 21 used as the fulcrum.

Figure 4:
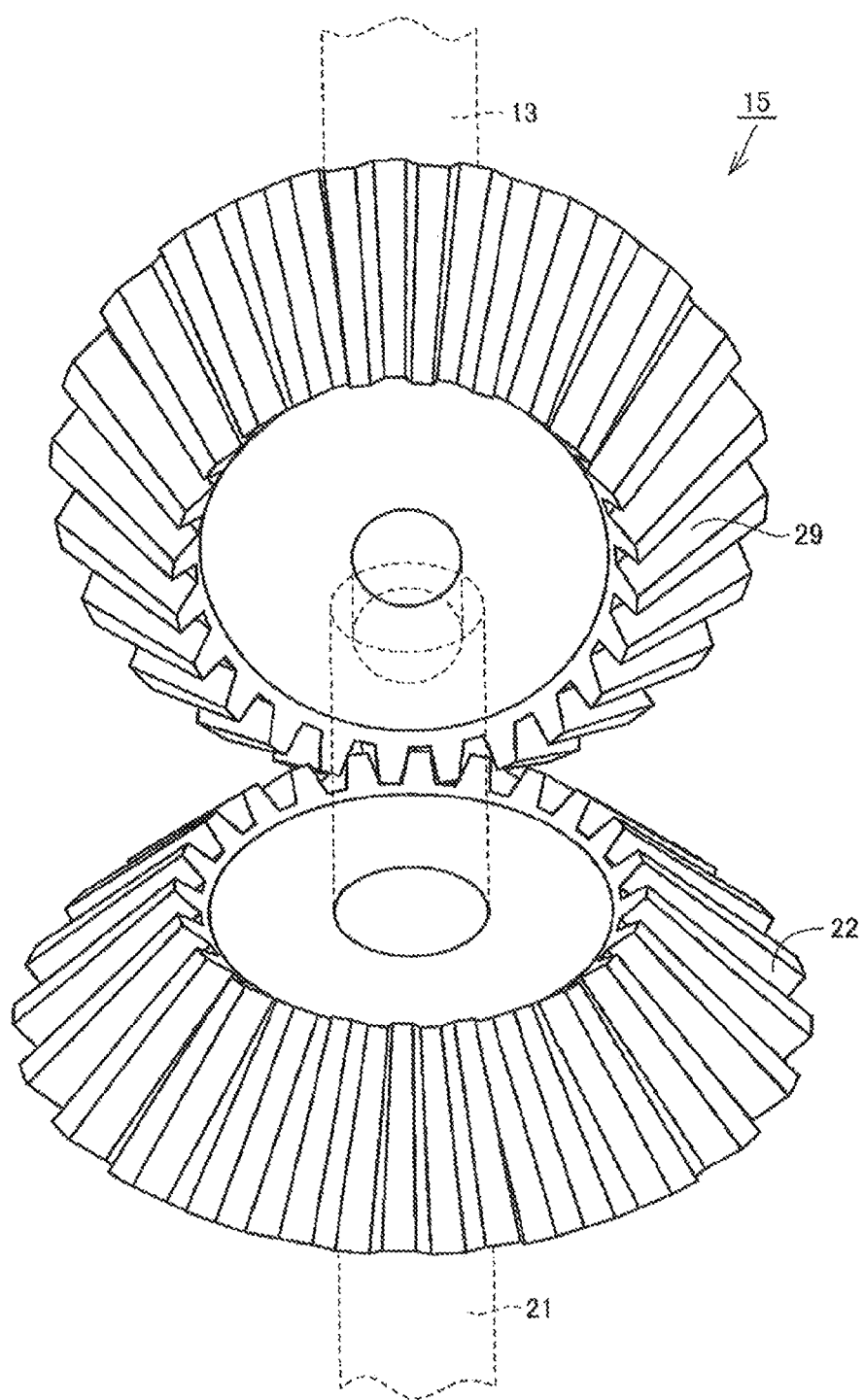
FIG. 4 is an external view when a revolving mechanism shown in FIG. 1 is seen from a rear side.
Figure 5:
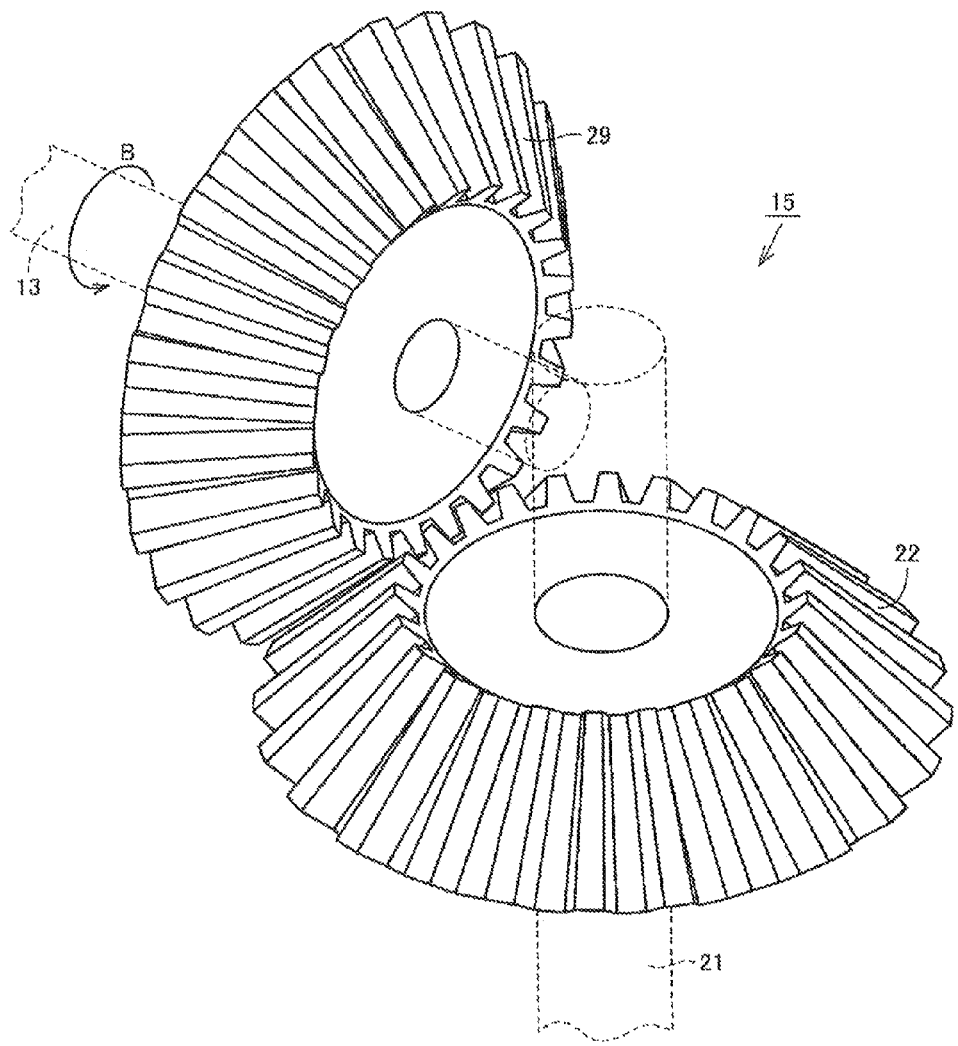
FIG. 5 is an external view showing a state where an arm part is turned to a left side of the viewer from the state shown in FIG. 4.

The above-described configuration of the viewing object retention device 11 enables the viewer A to move the viewing object 14 in the right and left directions of the viewer A by turning the arm part 13, centering on the turning shaft rod 21. Moreover, the revolving mechanism 15 provided in the viewing object retention device 11 enables the viewing object 14 to be revolved in conjunction with the turning of the arm part 13. This mechanism will be described with reference to FIGS. 4 and 5. FIG. 4 is an external view when the revolving mechanism 15 shown in FIG. 1 is seen from the rear side. FIG. 5 is an external view showing a state where the arm part 13 is turned to the left side of the viewer A from the state shown in FIG. 4. In FIGS. 4 and 5, in view of easiness of understanding, only the revolving mechanism 15, the arm part 13, and the turning shaft rod 21 are illustrated, and the arm part 13 and the turning shaft rod 21 are indicated by dashed lines.

Referring to FIGS. 4 and 5, as described above, the revolving mechanism 15 according to the present embodiment is made up of the arm-side bevel gear 29 firmly provided in the arm part 13, and the base-side bevel gear 22 firmly provided in the turning shaft rod 21 so as to be engaged with the arm-side bevel gear 29. When the arm part 13 is turned to the left side of the viewer A from the state shown in FIG. 4 to the state shown in FIG. 5, the arm-side bevel gear 29 moves on the base-side bevel gear 22 while being engaged with the base-side bevel gear 22. That is, the arm-side bevel gear 29 moves while revolving on the base-side bevel gear 22. Here, as described above, the arm-side bevel gear 29 is firmly provided integrally with the arm part 13. Accordingly, the arm part 13 revolves in a direction indicated by arrow B in FIG. 5, that is, counterclockwise when seen from the base part 12. In other words, when the arm part 13 is turned to the left side of the viewer A, the viewing object 14 attached to a forefront of the arm part 13 through the viewing object retention part 16 is revolved counterclockwise when seen from the viewer A. On the contrary, when the arm part 13 is turned to the right side of the viewer A, the viewing object 14 is revolved clockwise when seen from the viewer A. In this manner, in the viewing object retention device 11 according to the present embodiment, the configuration is such that the revolving mechanism 15 made up of the base-side bevel gear 22 and the arm-side bevel gear 29 allows the viewing object 14 to be revolved in conjunction with the turning of the arm part 13.

Figure 6:
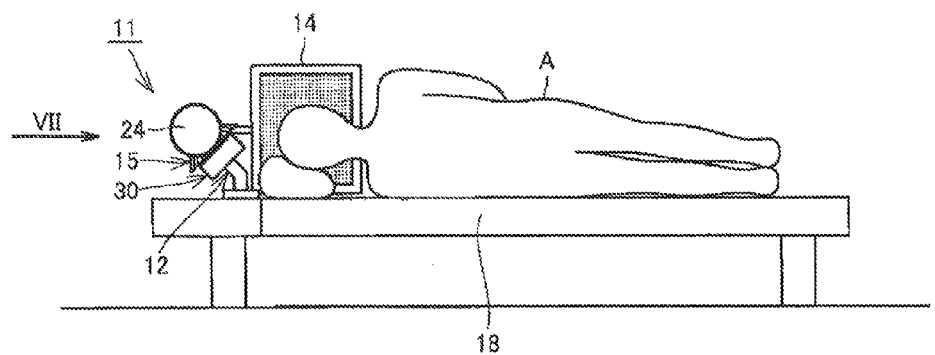
FIG. 6 is an external view when a state where the arm part is turned to the left side of the viewer from the position shown in FIG. 1 by 90° is seen from the right side of the viewer.
Figure 7:
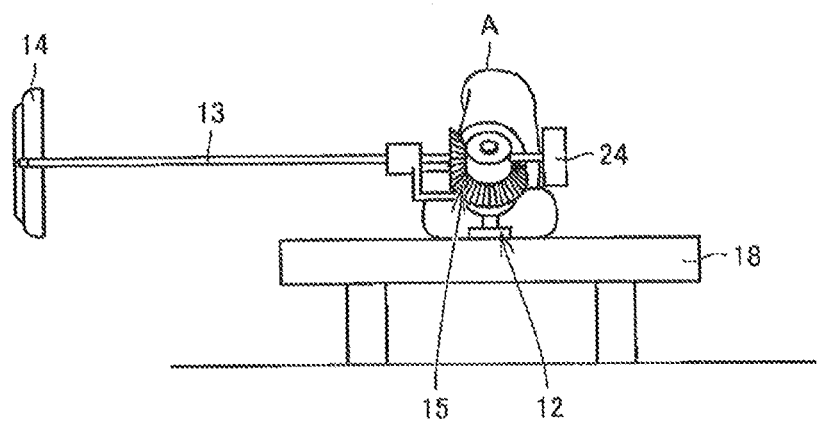
FIG. 7 is an external view when the state shown in FIG. 6 is seen from arrow VII in FIG. 6.

Next, a case will be described, with reference to FIGS. 6 and 7, where the viewer A views the viewing object 14 in the position lying with his or her body directed just laterally, using the viewing object retention device 11 according to the present embodiment. FIG. 6 is an external view when a state where the arm part 13 is turned to the left side of the viewer A from the position shown in FIG. 1 by substantially 90° is seen from the right side of the viewer A, corresponding to FIG. 1. FIG. 7 is an external view when the state shown in FIG. 6 is seen from arrow VII in FIG. 6, corresponding to FIG. 2.

Referring to FIGS. 6 and 7, when the viewer A tries to view the viewing object 14 in the position lying on his or her left side, the arm part 13 of the viewing object retention device 11 in the state shown in FIG. 1 is turned to the left side of the viewer A by substantially 90°. Consequently, the viewing object retention device 11 enters the state shown in FIGS. 6 and 7, and the viewing object 14 is arranged substantially in front of the viewer A lying on his or her left side. Moreover, with the revolution of the arm part 13, the arm part 13 is revolved by the above-described revolving mechanism 15 counterclockwise when seen from the viewer A.

Here, a gear ratio between the base-side bevel gear 22 and the arm-side bevel gear 29 making up the revolving mechanism 15 is set so as to revolve the arm part 13 up to a state where the viewing object 14 almost lies on its side, when the arm part 13 is turned from the position shown in FIG. 1 to the position shown in FIG. 6. That is, the gear ratio between the base-side bevel gear 22 and the arm-side bevel gear 29 is set so that when the viewer A turns the arm part 13 by substantially 90° to the left direction from the position shown in FIG. 1, in conjunction with this, the arm part 13 is revolved by an angle $\theta_1$ counterclockwise when seen from the viewer.

In the following Table 1, examples of an angle $\theta_A (=90°-\theta_1)$ of the arm part 13 with respect to the horizontal direction, numbers of teeth of the base-side bevel gear 22 and the arm-side bevel gear 29, and the gear ratio therebetween are shown.

TABLE 1

| $\theta_A$ | Number of teeth of base-side bevel gear | Number of teeth of arm-side bevel gear | Gear ratio |
|---|---|---|---|
| 0° | 30 | 30 | 1 |
| 30° | 20 | 30 | 1.5 |
| 45° | 20 | 40 | 2 |
| 60° | 15 | 45 | 3 |
| 90° | Unnecessary | Unnecessary | — |

More specifically, if the number of teeth of the base-side bevel gear 22 is $G_1$, and the number of teeth of the arm-side bevel gear 29 is $G_2$, a gear ratio $G_1/G_2$ between the base-side bevel gear 22 and the arm-side bevel gear 29 is set to satisfy $$(90°-\theta_A)/90° \approx G_1/G_2 \quad \text{(Equation 1)}$$

As shown in Table 1 and equation 1, by appropriately setting the gear ratio with respect to the angle $\theta_A$ of the arm part 13, the viewing object 14 is arranged substantially in front of the viewer A in the state almost lying on its side so as to accord with a direction of a face of the viewer A, which almost levels off, when the viewing object retention device 11 is put into the state shown in FIG. 6. This enables the viewer A to comfortably view the viewing object 14, even when the viewer A views the viewing object 14 in the position lying on his or her left side.

Moreover, as in the case where the viewer views the viewing object, lying on his or her left side shown in FIG. 6, a similar effect is exerted in a case where he or she views the viewing object, lying on his or her right side. That is, when the viewer A turns the arm part 13 rightward from the position shown in FIG. 1 by substantially 90°, the arm part 13 is revolved clockwise when seen from the viewer by the angle $\theta_1$ in conjunction with the turning, and thus, the viewing object 14 is arranged substantially in front of the viewer A in a state almost lying on its side. Accordingly, even when the viewer A views the viewing object 14 in the position lying on his or her right side, the viewer A can also view the viewing object 14 comfortably.

In the viewing object retention device 11 according to the present embodiment, the configuration is such that the revolving mechanism 15 gradually revolves the arm part 13 as proportional to a turning angle from the position of the arm part 13 shown in FIG. 1. Accordingly, also in the case where the arm part 13 is turned by an arbitrary angle in either of the right and left directions from the position shown in FIG. 1, the viewing object 14 is arranged so as to accord with the direction of the face of the viewer A viewing the viewing object retention device 11.

In this manner, the use of the viewing object retention device 11 according to the present embodiment allows the viewing object 14 to be arranged at an optimum viewing position by turning the arm part 13, whether the viewer A lies on his or her right or left side, and enables the angle of the viewing object 14 when seen from the viewer A to be automatically adjusted so as to accord with the direction of the face of the viewer. Accordingly, the viewer A can view the viewing object 14 comfortably by the extremely easy operation regardless of the direction of the lying body.

As described above, the viewing object retention part 16 is desirably fixed to the arm part 13 at substantially 90° with respect to the axis line 17 of the arm part 13. By attaching the viewing object retention part 16 to the arm part 13 in this manner, a sight line direction of the viewer A viewing the viewing object 14 and a surface of the viewing object 14 become orthogonal to each other, when the arm part 13 is turned to the state shown in FIGS. 6 and 7. The state where the viewing object 14 is retained in this manner is the easiest arrangement to view the viewing object 14 from the lying viewer A.

On the other hand, if the viewer A looks up the viewing object 14 retained in front of, and above the viewer A, using a pillow in the state where the arm part 13 is arranged immediately above the viewer A, the viewing object 14 becomes easiest to view, when the viewing object 14 is retained at a position at an angle of substantially 30° to 55° with respect to the horizontal position when seen from the viewer A.

Accordingly, comprehensively taking into consideration the above-described two preferable angles, and a length of the viewing object retention part 16 itself, the inclination angle of the arm part 13 to the horizontal direction is desirably set with respect to a range of about 40° to 70°.

Moreover, in the present embodiment, the revolving mechanism 15 to revolve the viewing object 14 in conjunction with the turning of the arm part 13 is realized by the simple configuration using the two bevel gears, which are general-purpose members. Accordingly, a manufacturing cost of the viewing object retention device 11 can be reduced.

While in the present embodiment, the configuration has been described in which the first bevel gear and the second bevel gear engaged with the first bevel gear allow the viewing object retention part to be revolved around the axis line of the arm part in conjunction with the turning of the arm part, the present invention is not limited thereto, but the revolving mechanism may be made up of any members that have the function of revolving the viewing object retention part as described above. That is, the revolving mechanism only needs to have a first abutting member in an arbitrary form provided in the base part, and a second abutting member in an arbitrary form that is provided in the arm part and abuts on the first abutting member relatively revolvably, and revolve the viewing object retention part around the axis line of the arm part through the first abutting member and the second abutting member with the turning of the arm part. For example, a revolving mechanism may be employed, in which the first and the second abutting members are made of rubber-based members and are arranged so as to come into pressure contact to each other. In this case, a frictional force caused between the first and the second abutting members by the pressure contact between the rubber-based members is utilized to revolve the viewing object retention part around the axis line of the arm part. Besides, the revolving mechanism may be made of a cam structure or may have a configuration using normal gears.

Moreover, in the present embodiment, at the rear end of the balancer supporting part 23, the balancer 24 is attached in order to provide the balance of the gravitational moment of the viewing object retention device 11. The weight of this balancer 24 is appropriately decided in view of a synthetic gravitational moment of the arm part 13 and the viewing object 14, and friction associated with the turning of the arm part 13, so that the arm part 13 can stand still at an arbitrary turning angle. A configuration may be employed, in which in place of the balancer 24, a spring member may be used to enable the arm part 13 to stand still at an arbitrary turning angle by an elastic force of the spring.

Figure 8:
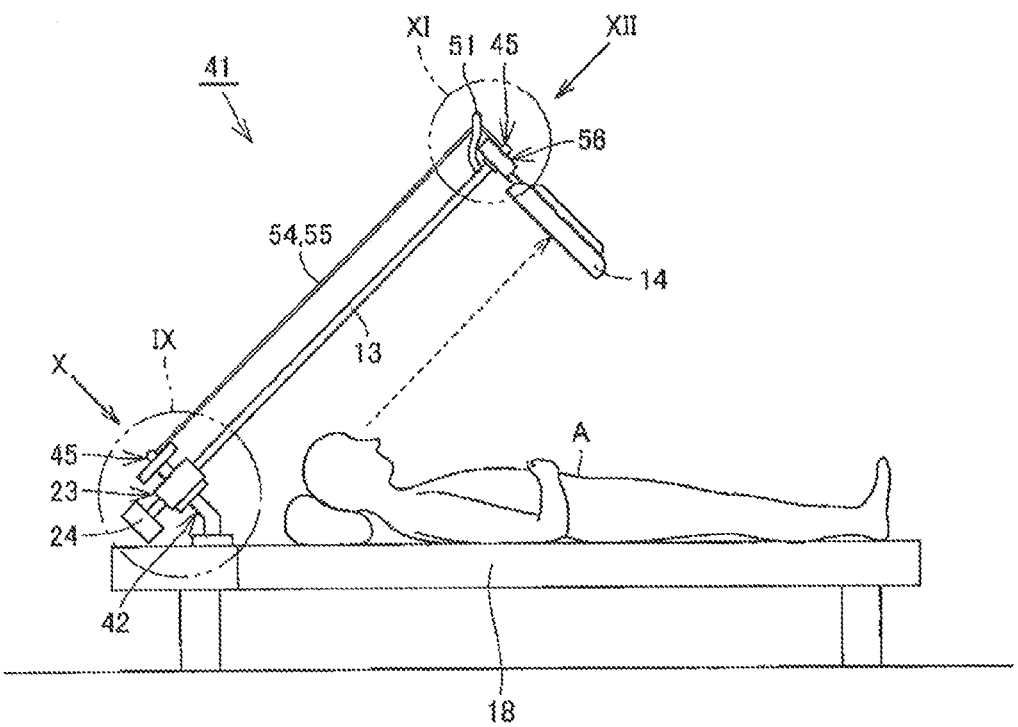
FIG. 8 is an external view when a state where a viewer is viewing a viewing object in a supine position, using a viewing object retention device according to another embodiment of the present invention, is seen from a right side of the viewer.
Figure 9:
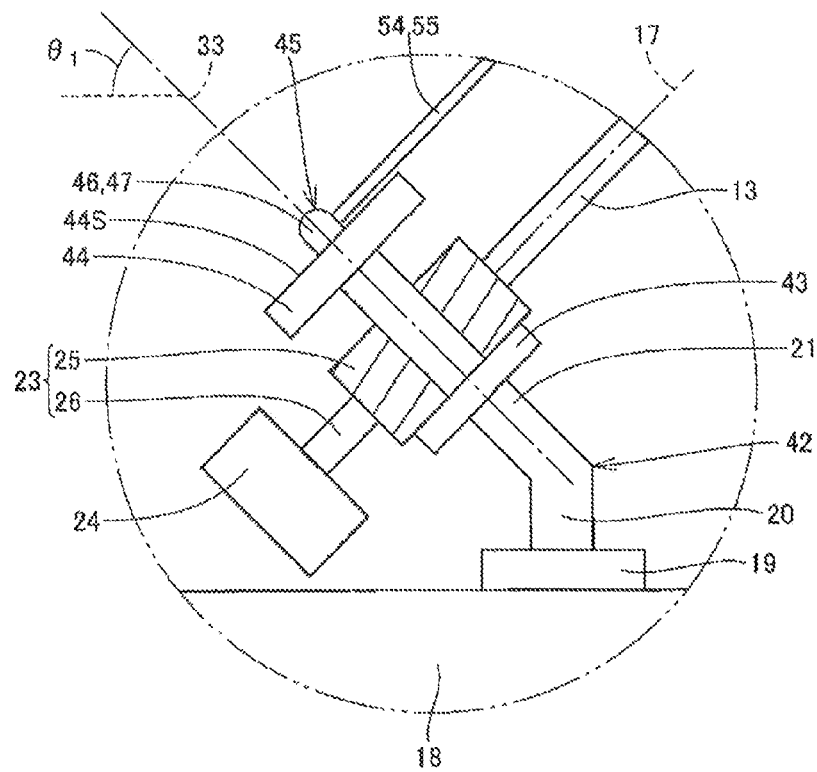
FIG. 9 is a cross-sectional enlarged view in which a region IX in FIG. 8 is enlarged and a part thereof is shown in a cross section.
Figure 10:
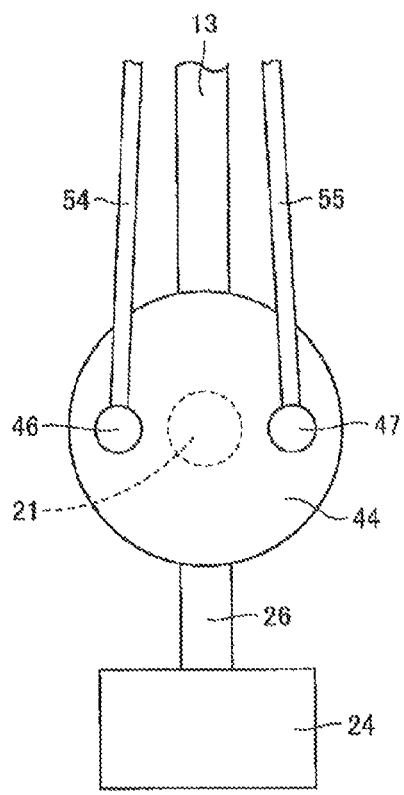
FIG. 10 is an enlarged view when the viewing object retention device shown in FIG. 8 is seen from arrow X in FIG. 8.
Figure 11:
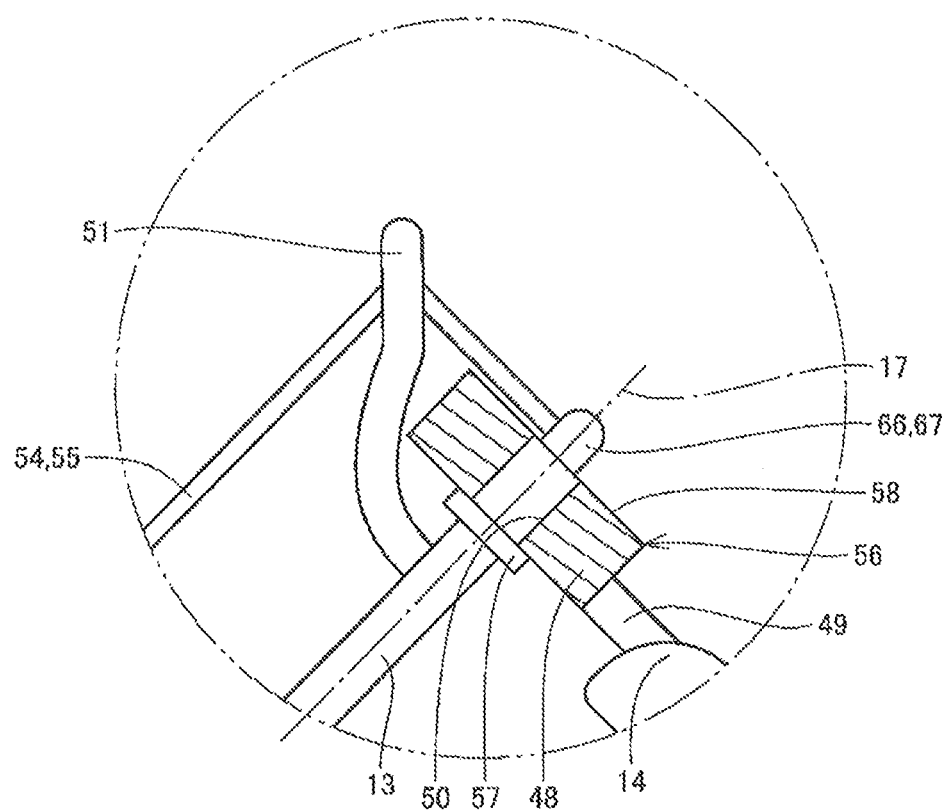
FIG. 11 is a cross-sectional enlarged view in which a region XI in FIG. 8 is enlarged and a part thereof is shown in a cross section.
Figure 12:
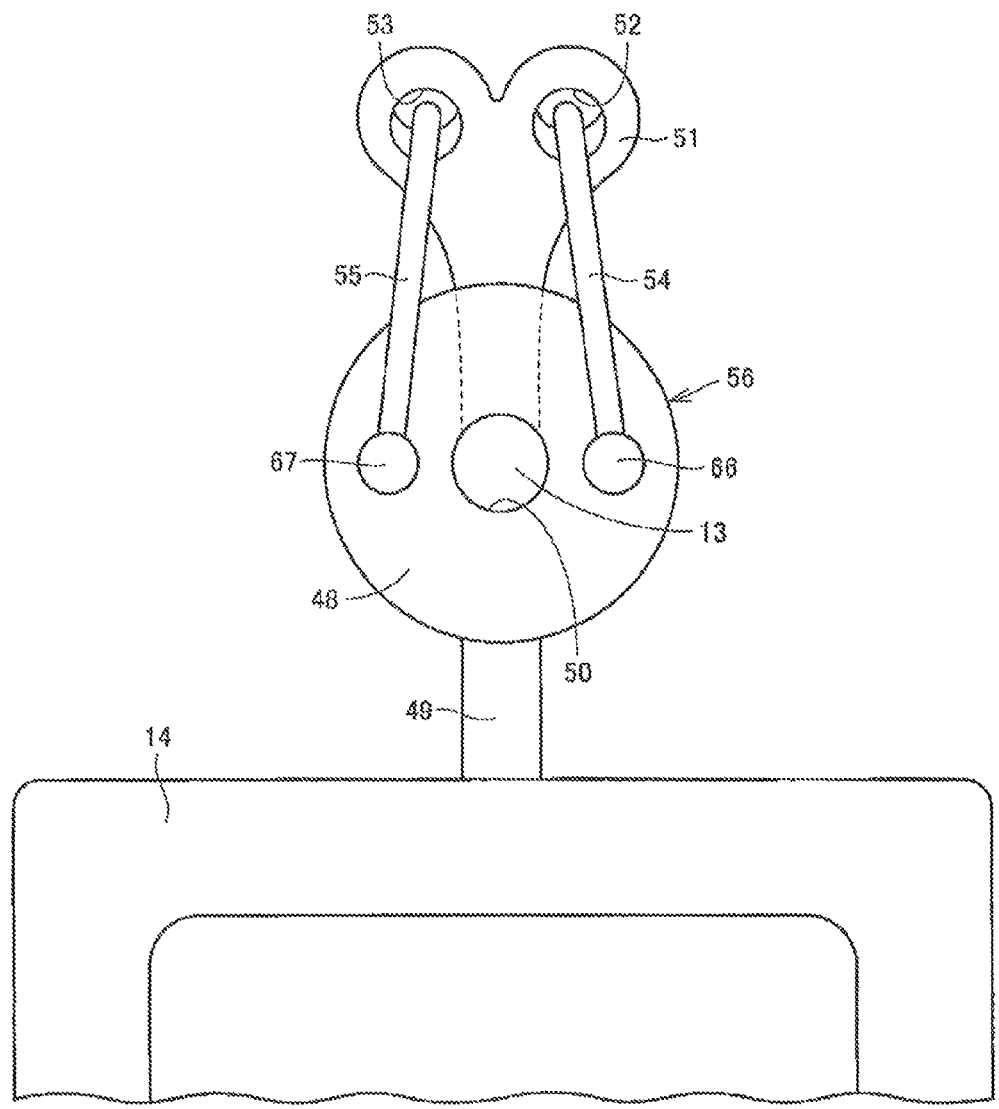
FIG. 12 is an enlarged view when the viewing object retention device shown in FIG. 8 is seen from arrow XII in FIG. 8.

Next, with reference to FIGS. 8 to 12, a configuration of a viewing object retention device 41 according to another embodiment of the present invention will be described. FIG. 8 is an external view when a state where a viewer A is viewing a viewing object 14 in a supine position, using the viewing object retention device 41 according to another embodiment of the present invention, is seen from a right side of the viewer A. FIG. 9 is a cross-sectional enlarged view in which a region IX in FIG. 8 is enlarged and a part thereof is shown in a cross section. FIG. 10 is an enlarged view when the viewing object retention device 41 shown in FIG. 8 is seen from arrow X in FIG. 8. FIG. 11 is a cross-sectional enlarged view in which a region XI in FIG. 8 is enlarged and a part thereof is shown in a cross section. FIG. 12 is an enlarged view when the viewing object retention device 41 shown in FIG. 8 is seen from arrow XII in FIG. 8. Members similar to those of the embodiment described in FIGS. 1 to 7 are given the same reference numerals, and detailed descriptions thereof are omitted.

Referring to FIGS. 8 to 12, the viewing object retention device 41 according to another embodiment of the present invention is provided with a base part 42 fixed to a head top portion side of the lying viewer A, an arm part 13 that is turnably joined to the base part 42 at a rear end thereof and retains the viewing object 14 at a front end thereof, and a revolving mechanism 45 to displace an angle of the viewing object 14 with the turning of the arm part 13.

As in the above-described embodiment, the base part 42 has a pedestal part 19, a base rod 20 extending vertically upward from the pedestal part 19, and a turning shaft rod 21 extending so as to be inclined at an angle $\theta_1$ from an upper end of the base rod 20 to an upper rear side. In the present embodiment, an annular part 43 is firmly fixed slightly below a central portion of the turning shaft rod 21 so as to extend in an outer diameter direction of the turning shaft rod 21. Moreover, at an upper end of the turning shaft rod 21, a circular disk part 44 is firmly provided so as to extend from the turning shaft rod 21 in the outer diameter direction, centering on an axis line 33 of the turning shaft rod 21. In an upper surface 44s of the disk part 44, projected parts 46 and 47 are provided at two positions so as to project upward and be rotationally symmetric with respect to the axis line 33.

The viewing object retention device 41 is further provided with a balancer supporting part 23 attached onto the annular part 43 of the turning shaft rod 21, and a balancer 24 attached to a rear end of the balancer supporting part 23. The balancer supporting part 23 has the turning shaft rod 21 inserted therein, and includes a ring part 25 abutting on an upper surface of the annular part 43, and a rod member 26 extending rearward from the ring part 25. In the present embodiment, the arm part 13 is fixed to a front end portion of the ring part 25, and is turnably jointed to the base part 42 through the ring part 25 with the turning shaft rod 21 used as a fulcrum.

At the front end of the arm part 13, a viewing object retention part 56 to detachably retain the viewing object 14 is attached turnably, centering on the axis line 17 of the arm part 13. More specifically, the viewing object retention part 56 includes a toric ring part 48 having a through-hole 50 at the center thereof, and a retention member 49 extending downward from the ring part 48. At a lower end portion of the retention member 49, the viewing object 14 is attached detachably. The arm part 13 is inserted into the through-hole 50 of the ring part 48, and the viewing object 14 attached to the retention member 49 is turnable, centering on the axis line 17 through the ring part 48. Moreover, on a front surface 58 of the ring part 48, projected parts 66 and 67 are provided at two positions so as to project to the front side and be rotationally symmetric with respect to the axis line 17. Also, at a front end portion of the arm part 13, an annular part 57 is integrally provided so as to project in an outer diameter direction from the arm part 13. This annular part 57 allows rearward movement of the viewing object retention part 56 to be restricted.

The viewing object retention device 41 according to the present embodiment is further provided with a first joining member 54 that is joined to the projected part 46 provided in the disk part 44 of the base part 42 at one end thereof, and is joined to the projected part 66 provided in the ring part 48 of the viewing object retention part 56 at the other end thereof, and a second joining member 55 that is joined to the projected part 47 provided in the disk part 44 at one end thereof, and is joined to the projected part 67 provided in the ring part 48 at the other end thereof. Furthermore, at the front end portion of the arm part 13, a relay member 51 to relay the first joining member 54 and the second joining member 55 is provided. The relay member 51 extends from the arm part 13 so as to increase a width upward, and has, in an upper portion thereof, a through-hole 52 and a through-hole 53 to insert the first joining member 54 and the second joining member 55 into.

That is, the first joining member 54 extends straight in an upper front direction from the projected part 46 as a fixed point firmly provided in the base part 42 to pass through the through-hole 52 of the relay member 51. Here, the first joining member 54 is bent downward substantially at a right angle to be joined to the projected part 66 as a movable point turnable around the axis line 17 together with the viewing object retention part 56. Similarly, the second joining member 55 extends straight in the upper front direction from the projected part 47 as a fixed point firmly provided in the base part 42 to pass through the through-hole 53 of the relay member 51. Here, the second joining member 55 is bent downward substantially at a right angle to be joined to the projected part 67 as a movable point turnable around the axis line 17 together with the viewing object retention part 56. Moreover, the first and second joining members 54 and 55 are tightly stretched without slack so as to maintain a predetermined tension inside from the projected parts 46 and 47 to the projected parts 66 and 67 through the through-holes 52 and 53 of the relay member 51.

Here, in the viewing object retention device 41 according to the present embodiment, the revolving mechanism 45 to revolve the viewing object 14 in conjunction with the turning of the arm part 13 is made up of the projected parts 46 and 47 firmly provided in the base part 42, the projected parts 66 and 67 firmly provided in the viewing object retention part 56, and the first and second joining members 54 and 55 joining these.

Figure 13:
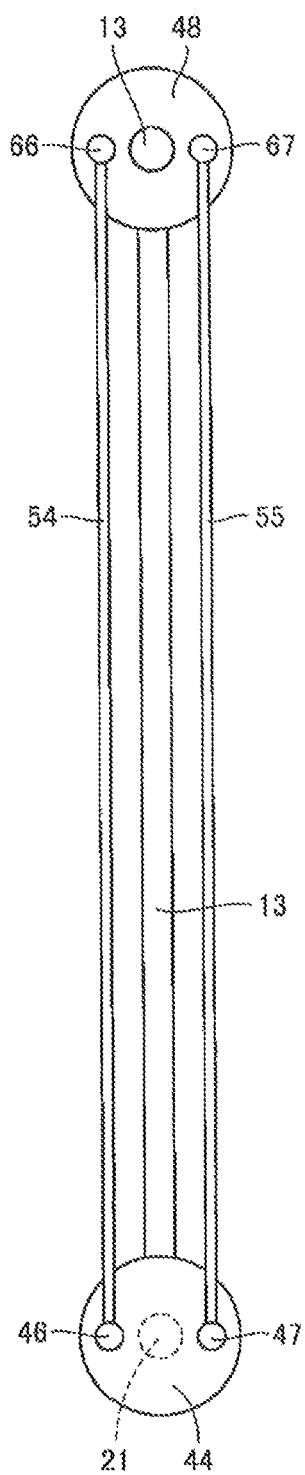
FIG. 13 is a schematic view showing a simple model of a revolving mechanism according to another embodiment of the present invention, showing a state where a turning angle of an arm part is 0°.
Figure 14:
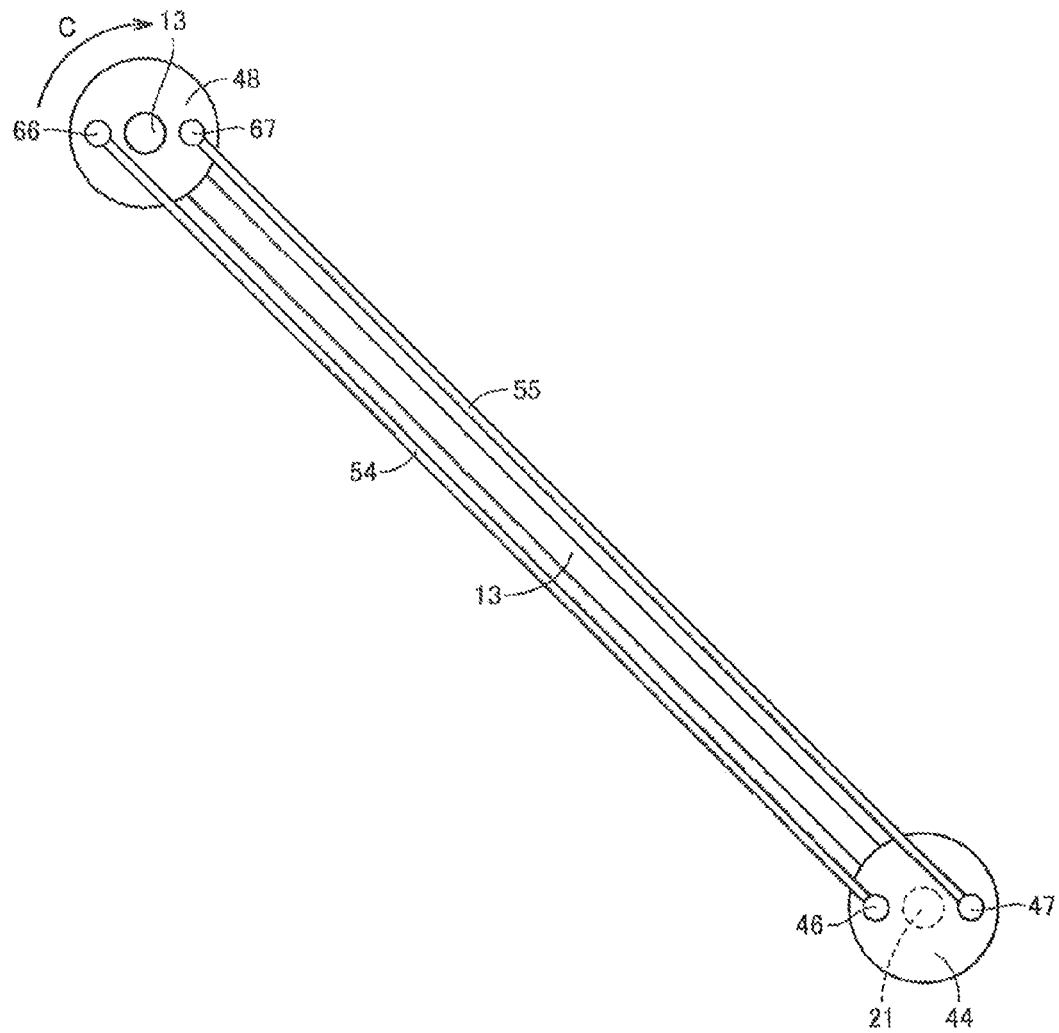
FIG. 14 shows a state where the turning angle of the arm part is 45° in the simple model of the revolving mechanism shown in FIG. 13.
Figure 15:
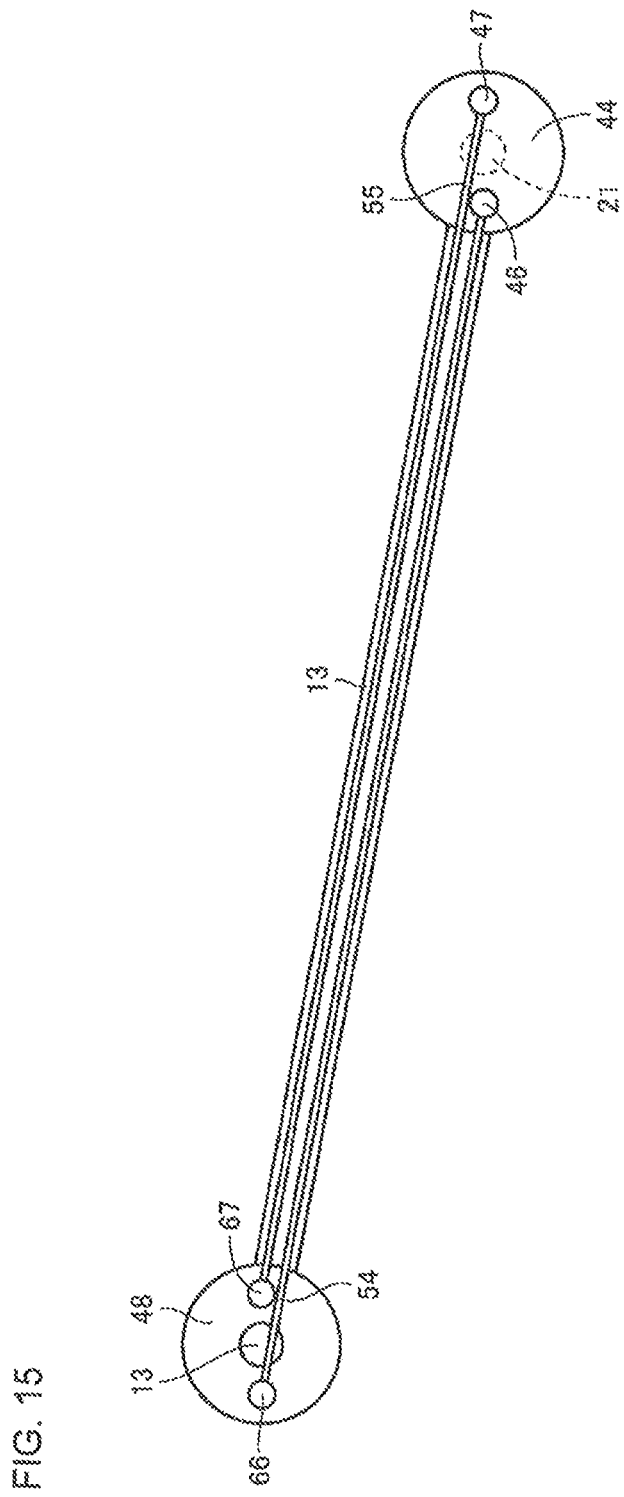
FIG. 15 shows a state where the turning angle of the arm part is substantially 90° in the simple model of the revolving mechanism shown in FIG. 13.

A mechanism of this revolving mechanism 45 will be described with reference to FIGS. 13 to 15. It should be noted that in FIGS. 13 to 15, for easiness of understanding, a simple model of the revolving mechanism 45 is shown, in which the disk part 44 of the base part 42 and the ring part 48 of the viewing object retention part 56 are arranged in the same plane, and that reference numerals in FIGS. 13 to 15 are displayed with the reference numerals of the corresponding members in the embodiment shown in FIGS. 8 to 12 used as references. FIG. 13 shows a state where the turning angle of the arm part 13 is 0°, FIG. 14 shows a state where the arm part 13 is turned leftward by 45°, and FIG. 15 shows a state where the arm part 13 is turned leftward by 90°.

Referring to FIGS. 13 and 14, as the arm part 13 is being turned from the state shown in FIG. 13 leftward with the turning shaft rod 21 of the base part 42 used as the fulcrum, a relative distance between the projected part 47 of the disk part 44 and the projected part 67 of the ring part 48 would be increasing. Here, the projected part 47 is an unmoved point provided in the base part 42, and the projected part 67 is a movable point turnable, centering on the arm part 13 together with the ring part 48. The projected part 47 and the projected part 67 are joined by the second joining member 55 having a predetermined length. Accordingly, as the arm part 13 is being turned leftward from the state shown in FIG. 13, the ring part 48 relatively revolves in a direction of arrow C in FIG. 14 when seen from the arm part 13, as shown in FIG. 14. Here, when the revolution direction C of the ring part 48 shown in FIG. 14 is caused to correspond to the embodiment shown in FIGS. 8 to 12, it is the counterclockwise revolution direction when seen from the viewer A. As shown in FIG. 15, in the state where the arm part 13 is turned by substantially 90°, a relative revolution angle of the ring part 48 when seen from the arm part 13 becomes largest.

On the contrary, as the arm part 13 is being turned rightward from the state shown in FIG. 13, a difference in a relative distance between the projected part 46 and the projected part 66 becomes larger, and thus, the first joining member 54 joining the projected part 46 and the projected part 66 allows the ring part 48 to revolve in a direction reverse to the foregoing. That is, when the direction is caused to correspond to the embodiment shown in FIGS. 8 to 12, it is a clockwise revolution direction when seen from the viewer A.

Furthermore, the relative revolution angle of the ring part 48 with respect to the arm part 13 in conjunction with the turning of the arm part 13 can be adjusted by appropriately setting the arrangement of the projected parts 46, 47, 66, and 67. For example, a distance between the projected parts 46 and 47 and the turning shaft rod 21, or a distance between the projected parts 66 and 67 and the arm part 13 is appropriately adjusted, by which the relative revolution angle of the ring part 48 can be adjusted.

By utilizing the above-described mechanism, in the viewing object retention device 41 according to the present embodiment, the viewing object 14 can be revolved in conjunction with the turning of the arm part 13. The revolving mechanism 45 can be configured such that when the arm part 13 is turned by substantially 90° from the position shown in FIG. 8 in either of the right and left directions, the viewing object 14 can be revolved until it is put into the state lying on its side as in the embodiment shown in FIG. 6. That is, when the viewer A turns the arm part 13 by substantially 90° leftward from the position shown in FIG. 8, in conjunction with this, the viewing object 14 can be revolved by the angle $\theta_1$ counterclockwise when seen from the viewer.

Figure 16:
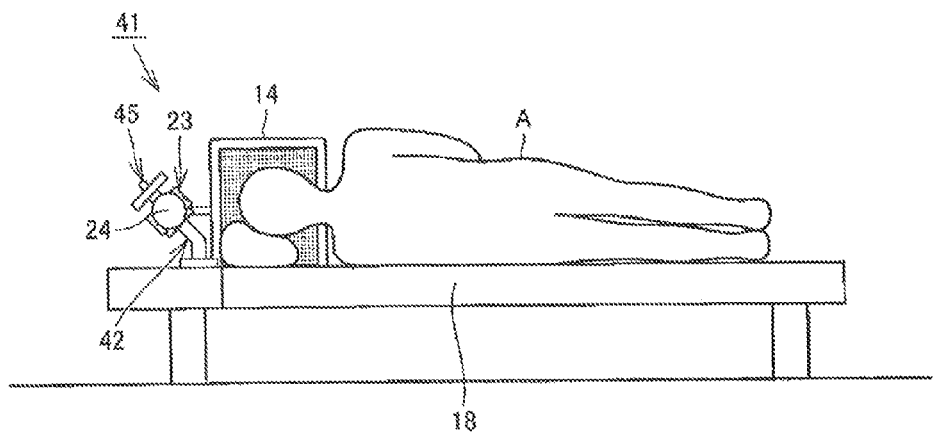
FIG. 16 is an external view when the state where the arm part is turned to the left side of the viewer by 90° is seen from the right side of the viewer in the viewing object retention device shown in FIG. 8.

The state is shown in FIG. 16. FIG. 16 is an external view when the state where the arm part 13 is turned to the left side of the viewer A by substantially 90° is seen from the right side of the viewer A, corresponding to FIG. 8. As shown in FIG. 16, the use of the viewing object retention device 41 according to the present embodiment allows the viewing object 14 to be arranged at an optimum viewing position by turning the arm part 13, whether the viewer A lies on his or her right or left side, and enables the angle of the viewing object 14 when seen from the viewer A to be automatically adjusted so as to accord with the direction of the face of the viewer. Accordingly, the viewer A can view the viewing object 14 comfortably by the extremely easy operation regardless of the direction of the lying body.

In the present embodiment, the revolving mechanism 45 to revolve the viewing object 14 in conjunction with the turning of the arm part 13 is realized by the projected parts provided in the base part 42 and the viewing object retention part 56, and the joining member joining these. Accordingly, since the structure is simple, and the number of required members can be kept to minimum, a manufacturing cost of the viewing object retention device 41 can be reduced.

The first and second joining members 54 and 55 used in the present embodiment may be each made of a linear member that is unstretchable in the extending direction and flexible, such as a cable, a wire, a rope, a belt, a chainlike member, and a galvanized steel wire, and a rod member having rigidity or the like. In the case where the joining members are each made of the rod member having rigidity, the above-described function can be realized by one joining member.

Next, a viewing object retention device 141 according to still another embodiment of the present invention will be described with reference to FIGS. 17 to 28. First, referring to FIGS. 17 to 23, a configuration of the viewing object retention device 141 according to the aforementioned still another embodiment of the present invention will be described. Members similar to those of the above-described embodiments are given the same reference numerals, and detailed descriptions thereof are omitted.

The viewing object retention device 141 according to the aforementioned still another embodiment of the present invention is provided with a base part 142 fixed to a head top portion side of a lying viewer A, an arm part 13 that is turnably joined to the base part 142 at a rear end thereof and retains a viewing object 14 at a front end thereof, and a revolving mechanism 145 to displace an angle of the viewing object 14 with the turning of the arm part 13.

The base part 142 has a pedestal part 19, a base rod 20 extending vertically upward from the pedestal part 19 and curved in an upper front direction at a predetermined height, and a circular turning shaft rod 21 extending so as to be inclined from an upper end of the base rod 20 to an upper rear side.

The turning shaft rod 21 is provided so as to be inclined at an angle $\theta_1$ with respect to the horizontal direction as in the above-described embodiments. At a lower end portion, a central portion, and an upper end portion of the turning shaft rod 21, annular parts 146, 147, and 148 that increase diameters thereof in an outer diameter direction from the turning shaft rod 21 are firmly provided, respectively.

Between the lower-end annular part 146 and the central annular part 147, a toric ring part 25 is arranged turnably with the turning shaft rod 21 inserted therein. The arm part 13 is fixed to the ring part 25, and is turnably jointed to the base part 142 through the ring part 25 with the turning shaft rod 21 used as a fulcrum. As in the above-described embodiments, an axis line 17 of the arm part 13 is orthogonal to an axis line 33 of the turning shaft rod 21. That is, the arm part 13 is inclined at $(90-\theta_1)°$ with respect to the horizontal direction, and extends to a space above the viewer A from a joining point to the base part 142.

Between the central annular part 147 and the upper-end annular part 148, a toric fixed pulley 143 is fixed so as to be incapable of relative revolution with respect to the turning shaft rod 21. In an outer circumferential surface 144 of the fixed pulley 143, a guide groove 149 depressed inward from the outer circumferential surface 144 is formed. This guide groove 149 is provided continuously over the whole circumference of the outer circumferential surface 144 of the fixed pulley 143. Inside this guide groove 149, a joining belt 150 described later is tightly stretched relatively unmovably with respect to the fixed pulley 143. As a method for stretching the joining belt 150 on the fixed pulley 143 relatively unmovably, any method may be applied. For example, a configuration may be such that in the outer circumferential surface of the fixed pulley 143 and the joining belt 150, tooth portions engaged with each other are provided, and engaging these tooth portions with each other makes the joining belt 150 relatively unmovable. That is, a configuration may be such that as the joining belt 150, a so-called timing belt is applied, and a project/depression shape that is engaged with this timing belt is provided in the outer circumferential surface of the fixed pulley 143. Moreover, a configuration may be employed in which the joining belt 150 is bound to the fixed pulley 143, or a configuration may be employed in which the joining belt 150 is fixed by a fastener. As the joining belt 150, there may be applied a linear member that is unstretchable in the extending direction and flexible, such as a cable, a wire, a rope, a belt (including the timing belt), a chainlike member, and a galvanized steel wire, and an assembly member made up of an outer tube and an inner cable inserted into the outer tube relatively movably, which is used in relief of a camera.

At the front end of the arm part 13, a viewing object retention part 156 to detachably retain the viewing object 14 is attached revolvably centering on the axis line 17 of the arm part 13. Specifically, the viewing object retention part 156 is attached to the arm part 13 through a toric revolving pulley 153 into which the arm part 13 is inserted revolvably.

The arm part 13 is inserted into the revolving pulley 153 revolvably between annular parts 151 and 152 provided at a distance from each other at two positions of a front end portion of the arm part 13. Similar to the above-described fixed pulley 143, in an outer circumferential surface 154 of the revolving pulley 153, a guide groove 159 depressed inward from the outer circumferential surface 154 is formed continuously over the whole circumference of the outer circumferential surface 154. Inside this guide groove 159, another side of the joining belt 150 is tightly stretched relatively unmovably with respect to the revolving pulley 153.

In the present embodiment, an annular part 164 is provided at a forefront of the arm part 13, and between the annular part 164 and the revolving pulley 153, a torsional spring 165 that exerts an elastic force in accordance with turning displacement of the arm part 13 on the revolving pulley 153 is attached. This configuration will be described later.

The viewing object retention part 156 is joined to the revolving pulley 153 at an upper end thereof, and detachably retains the viewing object 14 at a rear end thereof. The viewing object retention part 156 according to the present embodiment is made of a rod member having a predetermined length, and is joined to the revolving pulley 153 substantially orthogonally to the arm part 13. As in the above-described embodiments, the viewing object retention part 156 is preferably fixed to the arm part 13 at a substantially 90° with respect to the axis line 17 of the arm part 13. However, the present embodiment is not limited thereto, but the arm part 13 may be fixed at an angle ranging 80° to 100° with respect to the axis line 17. Moreover, an inclination angle $(90°-\theta_1)$ of the arm part 13 with respect to the horizontal direction is desirably set to a range of about 40° to 70°.

At the front end portion of the arm part 13, a belt guide 155 to guide the joining belt 150 stretched between the fixed pulley 143 and the revolving pulley 153 is provided. The belt guide 155 includes a T-shaped belt guide member 157 extending upward from the arm part 13, and circular right and left guide pulleys 160 and 161 provided at both right and left ends of the belt guide member 157. The right and left guide pulleys 160 and 161 are each formed with a guide groove depressed inward from an outer circumferential surface, and the joining belt 150 is tightly stretched in the guide groove.

In this manner, the joining belt 150 according to the present embodiment is a belt continuing annularly, and is tightly stretched around outer circumferences of the fixed pulley 143 and the revolving pulley 153 without slack through the belt guide 155.

The joining belt 150 is guided by the belt guide 155 relatively movably with respect to the belt guide 155. Accordingly, as a configuration for realizing the foregoing, a configuration may be employed, in which the joining belt 150 is retained relatively slidably in the guide grooves of the right and left guide pulleys 160 and 161, or a configuration may be employed, in which the right and left guide pulleys 160 and 161 are attached to the belt guide member 157 revolvably. Moreover, the present embodiment is not limited to the above-described pulleys, but a member having any shape that guides the joining belt 150 relatively movably may be applied.

The viewing object retention device 141 according to the present embodiment is further provided with an arm retention spring 158 to pull the arm part 13 to the base part 142 side. This arm retention spring 158 is a tensile coil spring stretchable in an extending direction, and one end thereof is attached to a spring attachment part 162 provided in the upper-end annular part 148 of the base part 142, while the other end thereof is attached to a spring attachment part 163 provided in a front portion of the arm part 13. This arm retention spring 158 is a member to assist stillness of the arm part 13 at an arbitrary position, when the arm part 13 is turned rightward or leftward to be arranged at the position.

The viewing object retention device 141 according to the present embodiment is provided with the revolving mechanism 145 to revolve the viewing object 14 with the turning of the arm part 13, as in the above-described embodiments. More specifically, when the arm part 13 is turned in the left direction of the viewer A, the revolving mechanism 145 revolves the viewing object retention part 156 counterclockwise when seen from the viewer A, and when the arm part 13 is turned in the right direction of the viewer A, the revolving mechanism 145 revolves the viewing object retention part 156 clockwise when seen from the viewer A. In the present embodiment, this revolving mechanism 145 is made up of the fixed pulley 143 fixed to the base part 142, the revolving pulley 153 having the front end portion of the arm part 13 revolvably inserted therein, and the joining belt 150 tightly stretched between the fixed pulley 143 and the revolving pulley 153.

Figure 25:
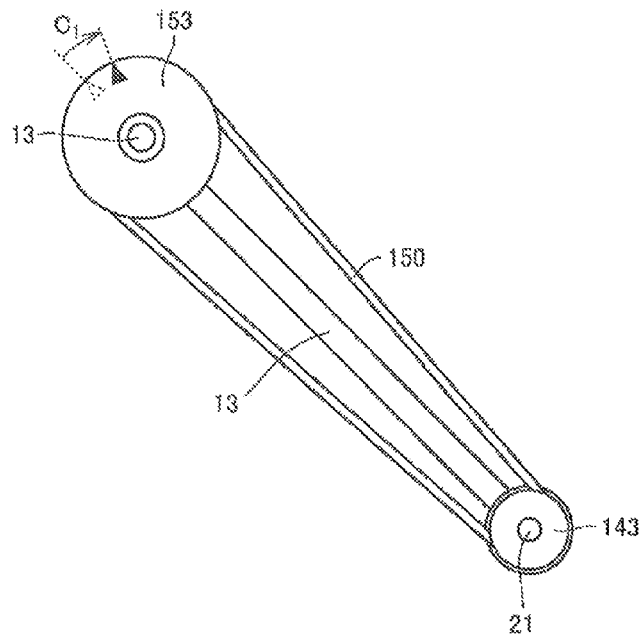
FIG. 25 shows a state where the turning angle of the arm part is 45° in the simple model of the revolving mechanism shown in FIG. 24.
Figure 26:
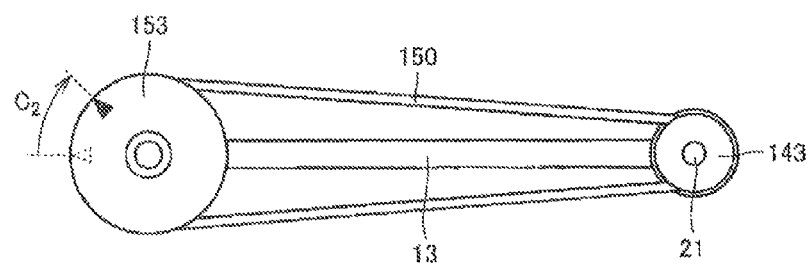
FIG. 26 shows a state where the turning angle of the arm part is 90° in the simple model of the revolving mechanism shown in FIG. 24.

Hereinafter, referring to FIGS. 24 to 26, a mechanism of the revolving mechanism 145 according to the present embodiment will be described. It should be noted that in FIGS. 24 to 26, in terms of easiness of understanding, a simple model of the revolving mechanism 145 in which the fixed pulley 143 and the revolving pulley 153 are arranged in the same plane is shown, and reference numerals in FIGS. 24 to 26 are displayed with the reference numerals of the corresponding members in the embodiment shown in FIGS. 17 to 23 used as references.

Figure 24:
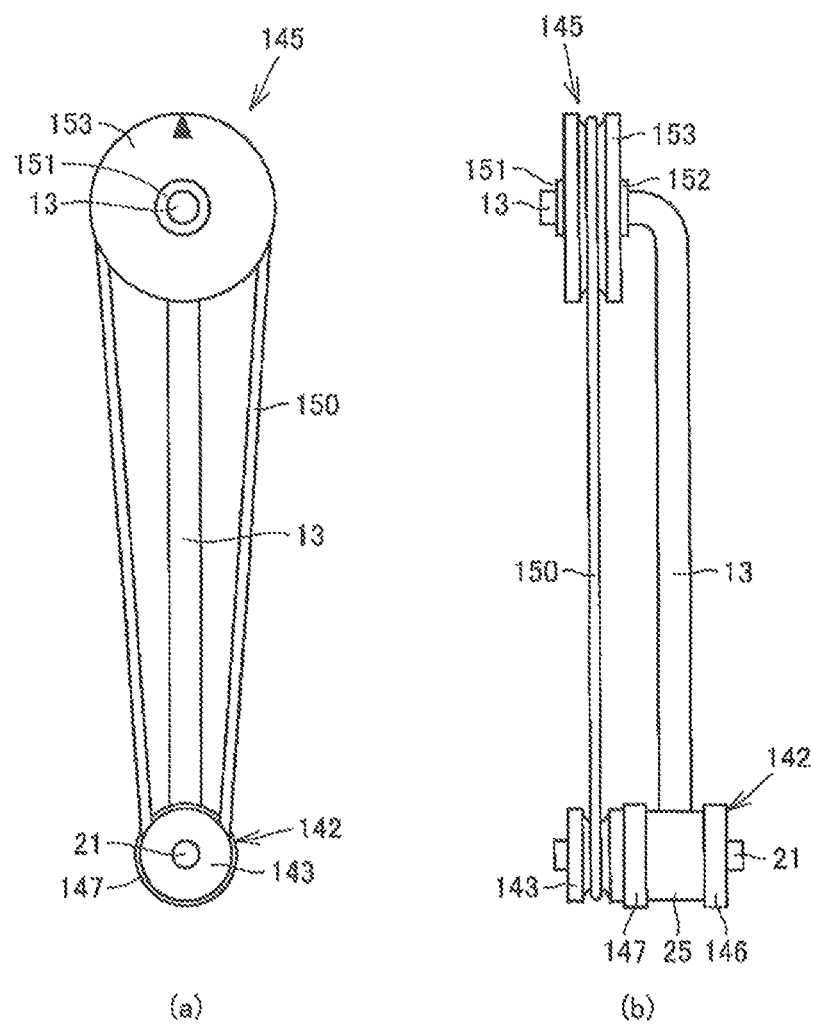
FIG. 24 is a schematic view showing a state where a turning angle of an arm part is 0° in a simple model of a revolving mechanism according to the embodiment shown in FIG. 17, in which (a) shows a plane view of the simple model, and (b) shows a side view thereof.

As shown in FIG. 24, as the arm part 13 is being turned leftward with the turning shaft rod 21 used as a fulcrum from a state where a turning angle of the arm part 13 is 0°, that is, a state where the arm part 13 is arranged immediately above the viewer in a vertical direction, the revolving pulley 153 revolves relative to the arm part 13 by the joining belt 150 tightly stretched relatively unmovably between the fixed pulley 143 and the revolving pulley 153. As shown in FIG. 25, in a state where when the arm part 13 is turned leftward by 45°, a movable point on the revolving pulley 153 (a black triangle in the figure) is relatively revolved by arrow $C_1$. That is, according to the revolving mechanism 145 according to the present embodiment, when the arm part 13 is turned leftward, the revolving pulley 153 can be turned relatively in a direction of arrow $C_1$ in conjunction with this. Here, when the revolution direction $C_1$ of the revolving pulley 153 shown in FIG. 25 is caused to correspond to the embodiment shown in FIG. 17, it is the counterclockwise revolution direction when seen from the viewer A. When the arm part 13 is further turned leftward from the state shown in FIG. 25 until the arm part 13 is turned by substantially 90° as shown in FIG. 26, the relative revolution angle of the revolving pulley 153 when seen from the arm part 13 becomes largest. That is, the revolving pulley 153 relatively revolves by an angle indicated by arrow $C_2$ in FIG. 26.

On the contrary, as the arm part 13 is being turned rightward from the state shown in FIG. 24, the revolving pulley 153 is relatively revolving in a direction reverse to the foregoing. That is, when the foregoing is caused to correspond to the embodiment shown in FIG. 17, in the case where the arm part 13 is turned rightward, the revolving pulley 153 revolves clockwise when seen from the viewer A.

By utilizing the above-described mechanism, in the viewing object retention device 141 according to the present embodiment, the viewing object 14 can be revolved in conjunction with the turning of the arm part 13. As in the above-described embodiments, this revolving mechanism 145 is configured so as to revolve the viewing object 14 to a state almost lying on its side, as shown in FIGS. 6 and 16, when the arm part 13 is turned by substantially 90° in either of right and left directions from the position shown in FIG. 17.

Here, according to the present embodiment, by appropriately setting a ratio between a diameter of the fixed pulley 143 and a diameter of the revolving pulley 153, the revolution angle indicated by arrow $C_2$ in FIG. 26 can be adjusted. Accordingly, when the viewer A turns the arm part 13 leftward by substantially 90° from the position shown in FIG. 17, the ratio between the diameter of the fixed pulley 143 and the diameter of the revolving pulley 153 is set so as to revolve the arm part 13 by the angle $\theta_1$ counterclockwise when seen from the viewer in conjunction with the turning.

Table 2 below shows an angle $\theta_A (=90°-\theta_1)$ of the arm part 13 with respect to the horizontal direction and the diameter ratio between the fixed pulley 143 and the revolving pulley 153.

TABLE 2

| $\theta_A$ | Fixed pulley diameter | Revolving pulley diameter |
|---|---|---|
| 0° | 1 | 1 |
| 30° | 2 | 3 |
| 45° | 1 | 2 |
| 60° | 1 | 3 |
| 90° | Unnecessary | Unnecessary |

More specifically, a diameter ratio $R_1/R_2$ between a diameter $R_1$ of the fixed pulley 143 and a diameter $R_2$ of the revolving pulley 153 is set so as to satisfy the following equation with respect to the angle $\theta_A$ of the arm 13 from the horizontal position:

$$(90°-\theta_A)/90° \approx R_1/R_2 \tag{Equation 2}$$

Figure 27:
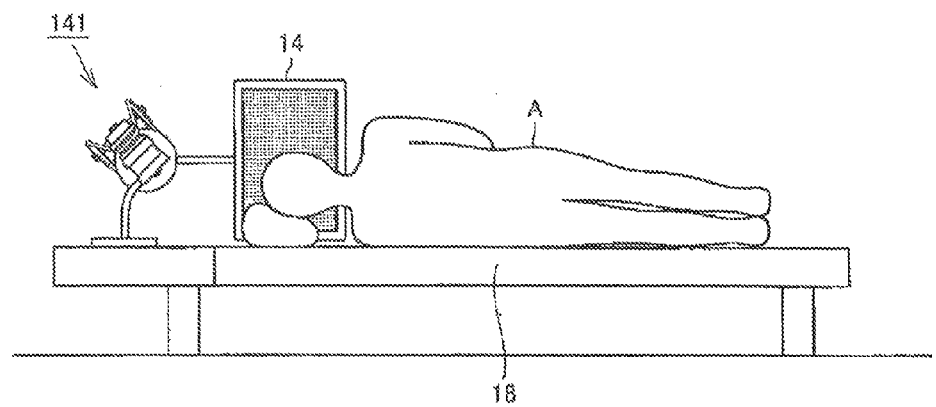
FIG. 27 is an external view when the state where the arm part is turned to the left side of the viewer by 90° is seen from the right side of the viewer in the viewing object retention device shown in FIG. 17.

As shown in Table 2 and equation 2, the revolving mechanism 145 can be configured such that appropriately setting the diameter ratio of the pulleys, corresponding to the angle $\theta_A$ of the arm part 13 allows the viewing object 14 to be revolved to the state almost lying on its side, when the arm part 13 is turned by substantially 90°. Specifically, when the arm part 13 is set so as to be inclined at $\theta_A=45°$ with respect to the horizontal direction, the diameter ratio between the fixed pulley 143 and the revolving pulley 153 is set to the fixed pulley/the revolving pulley=1/2. In this case, for example, when the arm part 13 is turned leftward by substantially 90°, in conjunction with this, the viewing object 14 is revolved counterclockwise when seen from the viewer by the angle $\theta_1=45°$. As a result, the viewing object 14 is put into the state almost lying on its side, and is arranged substantially in front of the viewer A. This state is shown in FIG. 27. As in the case where the viewer views the viewing object, lying on his or her left side shown in FIG. 27, a similar effect is exerted in the case where he or she views the viewing object, lying on his or her right side.

In this manner, according to the viewing object retention device 141 according to the present embodiment, the viewing object 14 can be arranged at an optimum viewing position by turning the arm part 13, whether the viewer A lies on his or her right or left side, and enables the angle of the viewing object 14 when seen from the viewer A to be automatically adjusted so as to accord with the direction of the face of the viewer. This allows the viewer A to view the viewing object 14 comfortably by the extremely easy operation regardless of the direction of the lying body.

According to the present embodiment, the revolving mechanism 145 is made up of the fixed pulley 143 and the revolving pulley 153, and the joining belt tightly stretched between them. Accordingly, since the structure is simple, and the number of required members can be kept to minimum, a manufacturing cost of the viewing object retention device 141 can be reduced.

Moreover, according to the present embodiment, the revolution angle of the revolving pulley 153 occurring in conjunction with the turning of the arm part 13 can be easily adjusted by appropriately setting the diameter ratio between the fixed pulley 143 and the revolving pulley 153. Thereby, the revolving mechanism 145 that exerts the above-described effect even when the inclination angle of the arm part 13 is arbitrarily set can be easily configured. Furthermore, by applying this concept, a configuration is applied, in which the inclination angle of the arm part 13 is made variable, and a parameter corresponding to the diameter ratio of the pulleys is adjusted appropriately in accordance with the inclination angle of the arm part 13, by which the viewing object retention device 141 more excellent in convenience can be realized.

Figure 28:
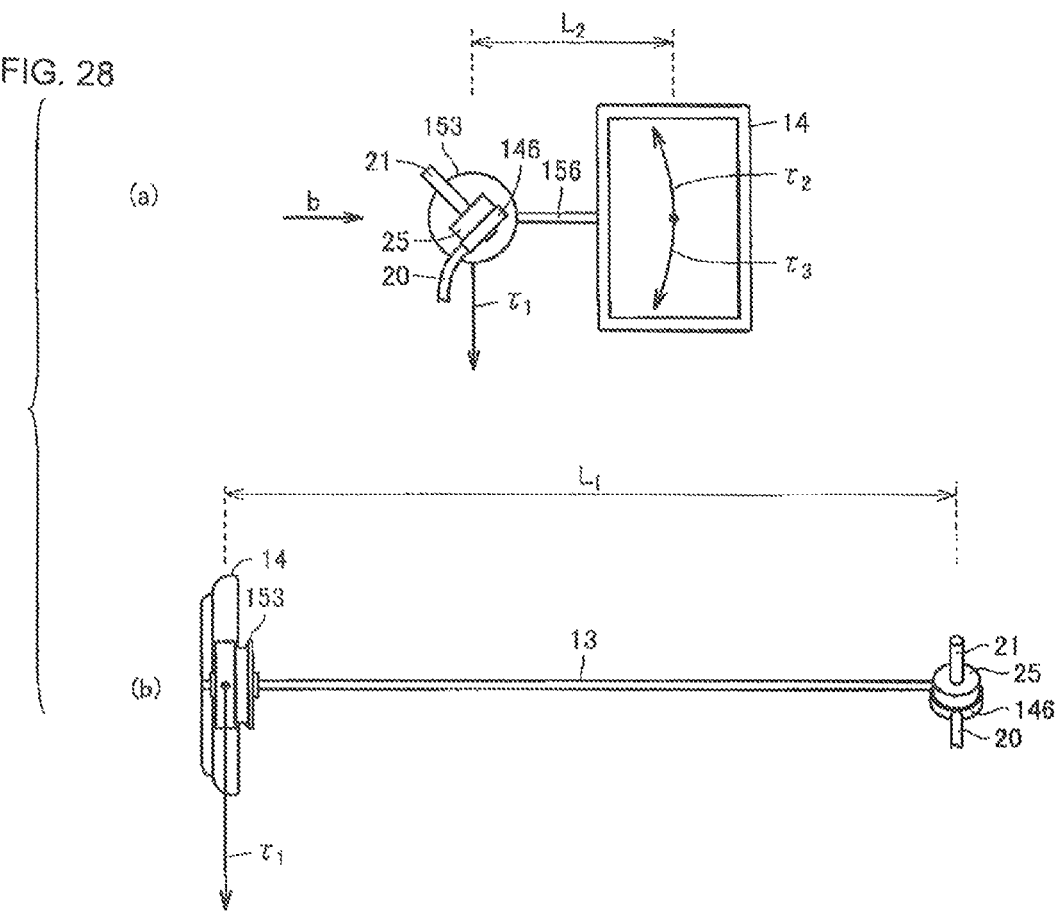
FIG. 28 is a view showing only a part of the members of the viewing object retention device in the state shown in FIG. 27, in which (a) is a view seen from the same direction as that of FIG. 27, and (b) is a view seen from arrow b in (a).

Moreover, according to the viewing object retention device 141 according to the present embodiment, a relatively simple configuration enables the arm part 13 to stand still at an arbitrary turning angle. This will be briefly described below with reference to FIG. 28. FIG. 28 is a view showing only a part of the members of the viewing object retention device 141 in the state shown in FIG. 27, in which (a) is a view seen from the same direction as that of FIG. 27, and (b) is a view seen from arrow b in (a).

In the state shown in FIG. 28, weights of the members such as the viewing object 14, the viewing object retention part 156, the revolving pulley 153, and the arm part 13 cause a moment $\tau 1$ depending on these weights and a distance $L_1$. Accordingly, the arm part 13 is put into a turnable state, the moment $\tau 1$ causes the arm part 13 to try to turn further downward with the turning shaft rod 21 used as a fulcrum.

Here, in the present embodiment, with the turning of the arm part 13, the above-described revolving mechanism 145 revolves the viewing object retention part 156 and the viewing object 14. That is, when the arm part 13 is turned downward from the state shown in FIG. 28, the revolving mechanism 145 causes a moment $\tau 2$ centering on the arm part 13 in a direction lifting the viewing object 14, as indicated by arrow $\tau 2$ in (a) of FIG. 28. In this manner, the downward turning of the arm part 13 by the moment $\tau 1$ and the moment $\tau 2$ caused attributed to this link to each other in a pair through the revolving mechanism 145. In other words, this means that if the moment $\tau 2$ can be suppressed, the downward turning of the arm part 13 can be restricted.

On the other hand, in the state shown in FIG. 28, the weights of the viewing object retention part 156 and the viewing object 14 cause a moment $\tau 3$ depending on these weights and a distance $L_2$ contradictorily to the moment $\tau 2$, as indicated by arrow $\tau 3$ in (a) of FIG. 28. This moment $\tau 3$ causes the viewing object 14, the viewing object retention part 156, and the revolving pulley 153 to try to revolve in a direction of arrow $\tau 3$ in (a) of FIG. 28, centering on the arm 13. Consequently, the joining belt 150 tightly stretched on the revolving pulley 153 is pulled, and the moment $\tau 3$ is converted into a force that turns the arm part 13 so as to contrarily lift up the arm part 13. That is, with reference to FIG. 26, when the revolving pulley 153 is forcibly revolved in the direction reverse to arrow $C_2$ from the state shown in FIG. 26, the joining belt 150 tightly stretched on the revolving pulley 153 is pulled, and as a result, the arm part 13 is pushed back to the state of FIG. 25 through the joining belt 150.

In this manner, in the present embodiment, the moment $\tau 1$ that turns the arm part 13 downward and the moment $\tau 3$ that is caused attributed to the weight of the viewing object 14 act so as to cancel out each other through the tension of the joining belt 150. With these moments $\tau 1$, $\tau 2$, and $\tau 3$, the weight of the viewing object 14 is one dependency parameter. Accordingly, the above-described distances $L_1$ and $L_2$, that is, lengths of the arm part 13 and the viewing object retention part 156, the diameter ratio between the revolving pulley 153 and the fixed pulley 143, weight balances of the components and the like, which are parameters other than the weight of the viewing object 14, are designed approximately, which enables the moments acting on the arm part 13 to be balanced regardless of the weight of the supported viewing object 14. That is, according to the present embodiment, the user can turn the arm part 13 by a relatively small force regardless of the weight of the supported viewing object including a relatively light-weight terminal device such as a cellular phone, an intermediate-weight tablet terminal device, and further an LCD and a thick book, which are relatively heavy, and the arm part 13 is enabled to stand still at an arbitrary position.

Figure 17:
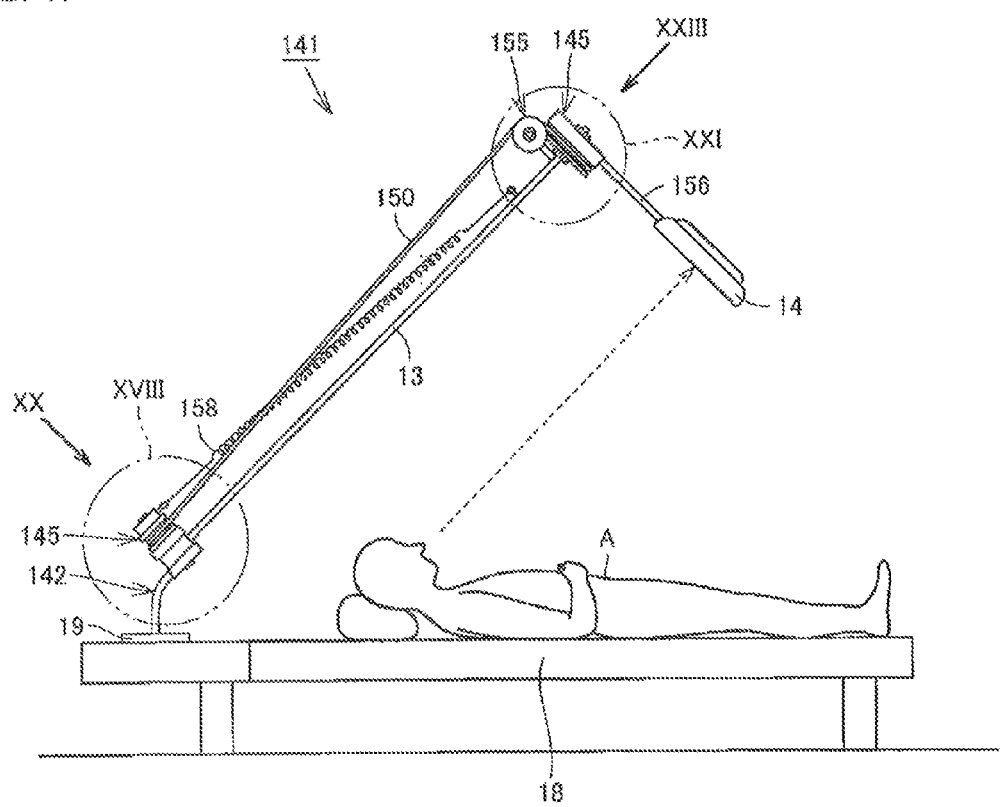
FIG. 17 is an external view showing a state where a viewer is viewing a viewing object in a supine position, using a viewing object retention device according to still another embodiment of the present invention, corresponding to FIG. 1.
Figure 18:
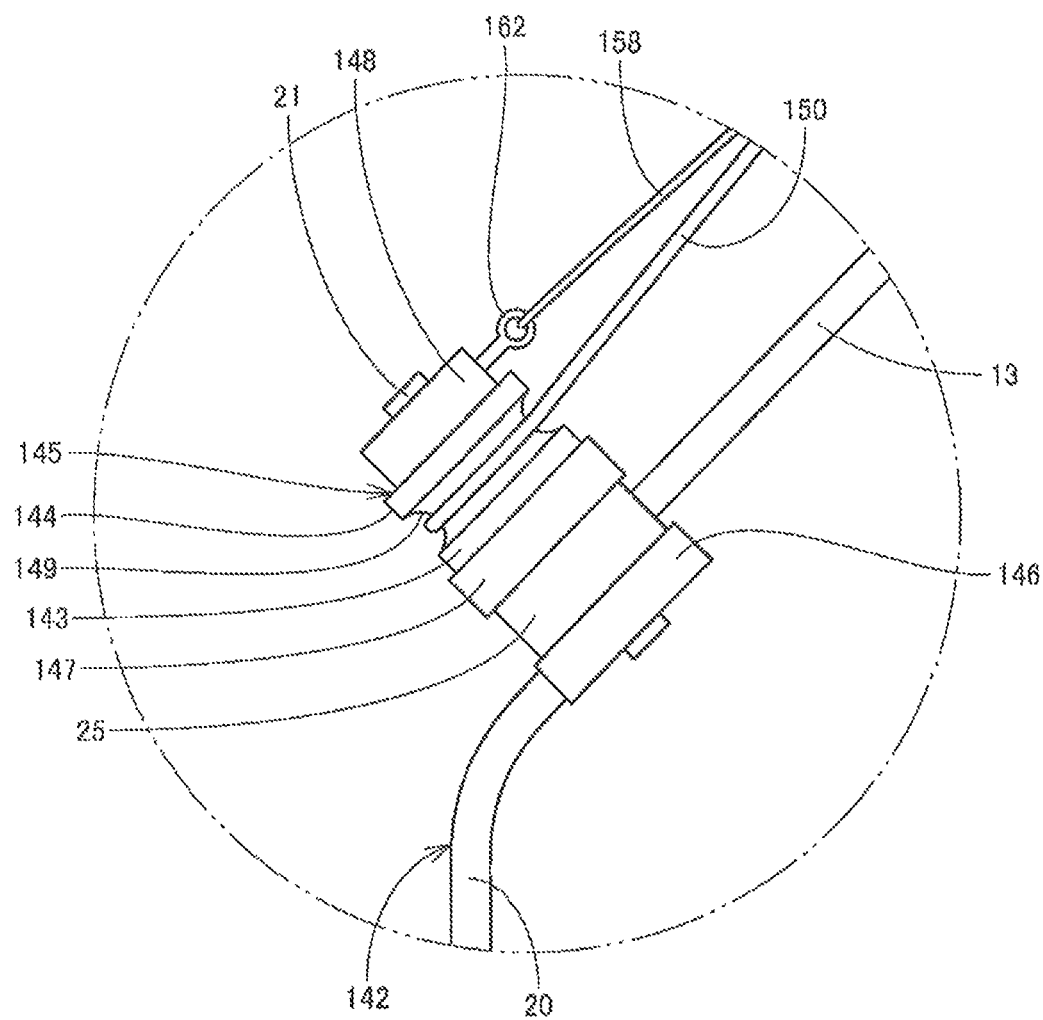
FIG. 18 is an enlarged view in which a region XVIII in FIG. 17 is enlarged.
Figure 19:
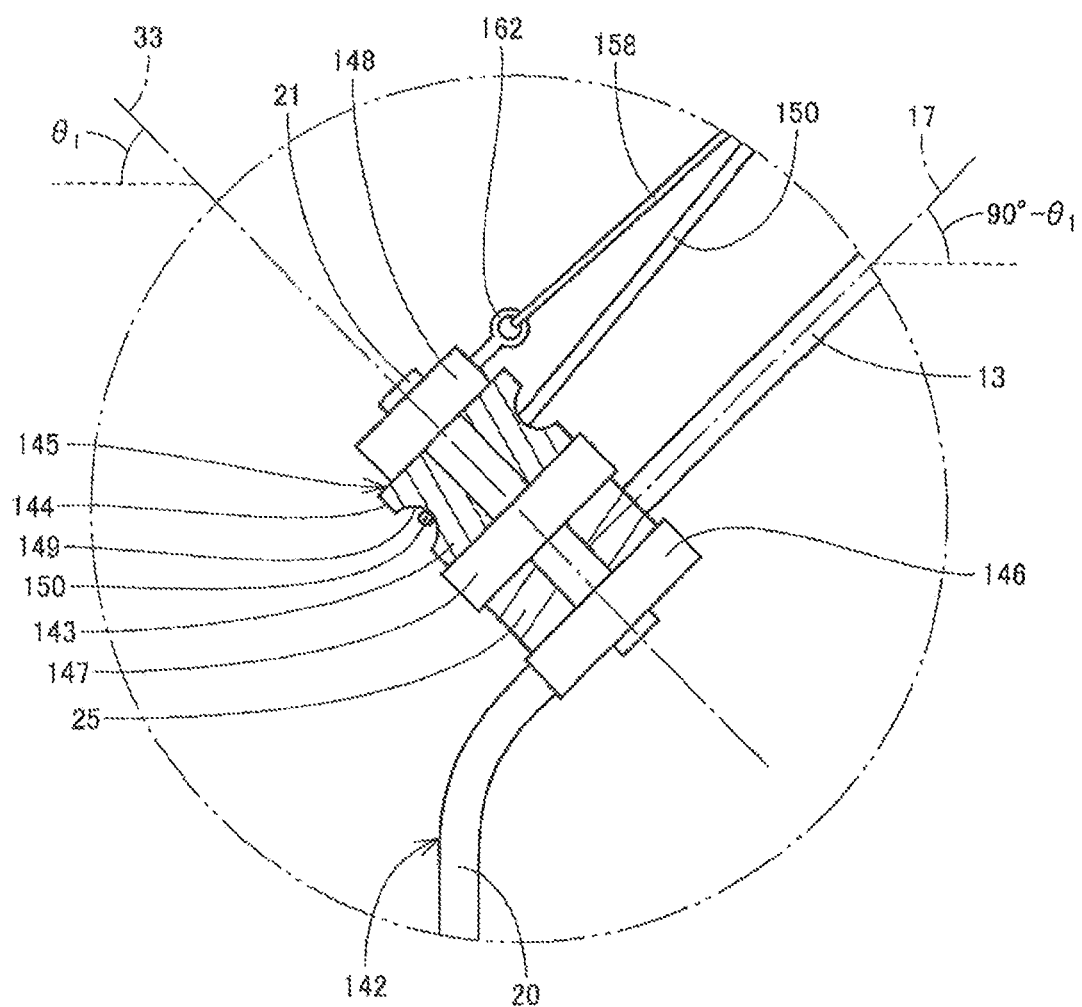
FIG. 19 is a cross-sectional enlarged view in which a part of FIG. 18 is shown in a cross section.
Figure 20:
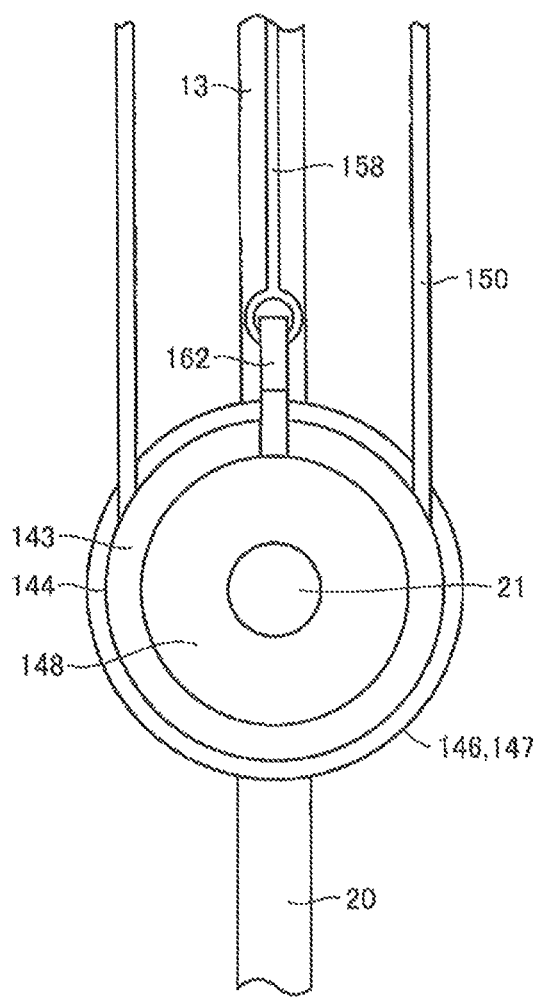
FIG. 20 is an external view when the viewing object retention device shown in FIG. 17 is seen from arrow XX in FIG. 17.

In the present embodiment, in order to assist balance of the above-described moments, the arm retention spring 158 is stretched between the arm part 13 and the base part 142 as the elastic member exerting the elastic force in accordance with the turning displacement of the arm part 13 on the arm part 13. More specifically, when the viewing object 14 is not retained by the viewing object retention part 156, or when the viewing object 14 is very light, the moment $\tau 3$ is very small. This actually makes it impossible that the moments acting on the arm part 13 are balanced. In order to compensate this, as shown in FIG. 17, the arm retention spring 158 is provided so as to raise the arm part 13. In this case, the elastic force of the arm retention spring is selected appropriately in view of assisting the balance of the moments. That is, by supplementarily using the arm retention spring 158, the moments acting on the arm part 13 can be balanced even if the viewing object 14 is very light or the like.

As the elastic member exerting, on the arm part 13, the elastic force in accordance with the turning displacement of the arm part 13, the present embodiment is not limited to the arm retention spring 158, but a spring that generates a repulsive elastic force in accordance with the turning displacement in accordance with the revolution displacement, such as a torsional spring and a twist coil spring, can be also applied. For example, a configuration may be such that the above-described spring is attached to the arm part 13 on the fixed pulley 143 side to exert, on the arm part 13, an elastic repulsive force proportional to the turning displacement of the arm part 13.

An elastic member that exerts an elastic force in accordance with the turning displacement of the arm part 13 on the viewing object retention part 156 may be further provided on the viewing object retention part 156 side. For example, the configuration may be such that as the above-described elastic member, a spring that generates the elastic force in accordance with the turning displacement, such as the torsional spring and twist coil spring, is applied, and the spring is attached to the viewing object retention part 156 to exert an elastic repulsive force on the viewing object retention part 156 in accordance with revolution angle displacement of the viewing object retention part 156 with respect to the axis line 17 of the arm part, which displacement is caused with the turning of the arm part 13.

Figure 21:
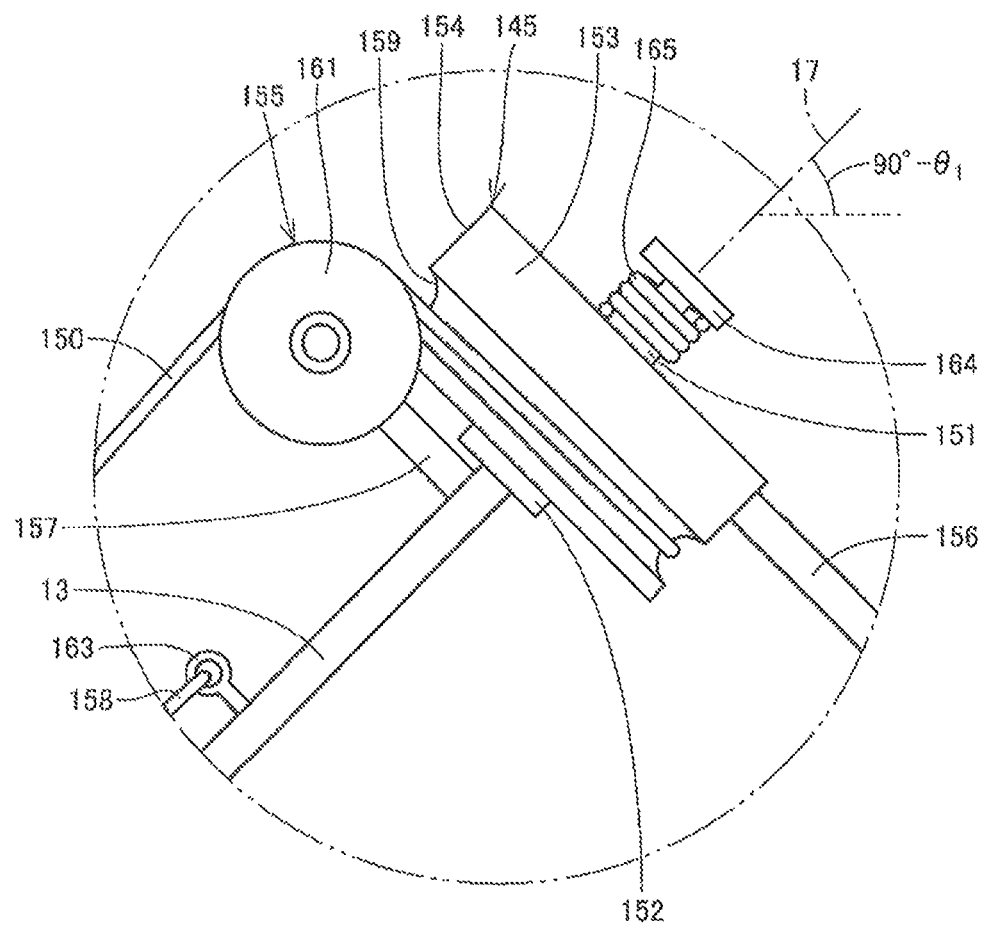
FIG. 21 is an enlarged view in which a region XXI in FIG. 17 is enlarged.
Figure 22:
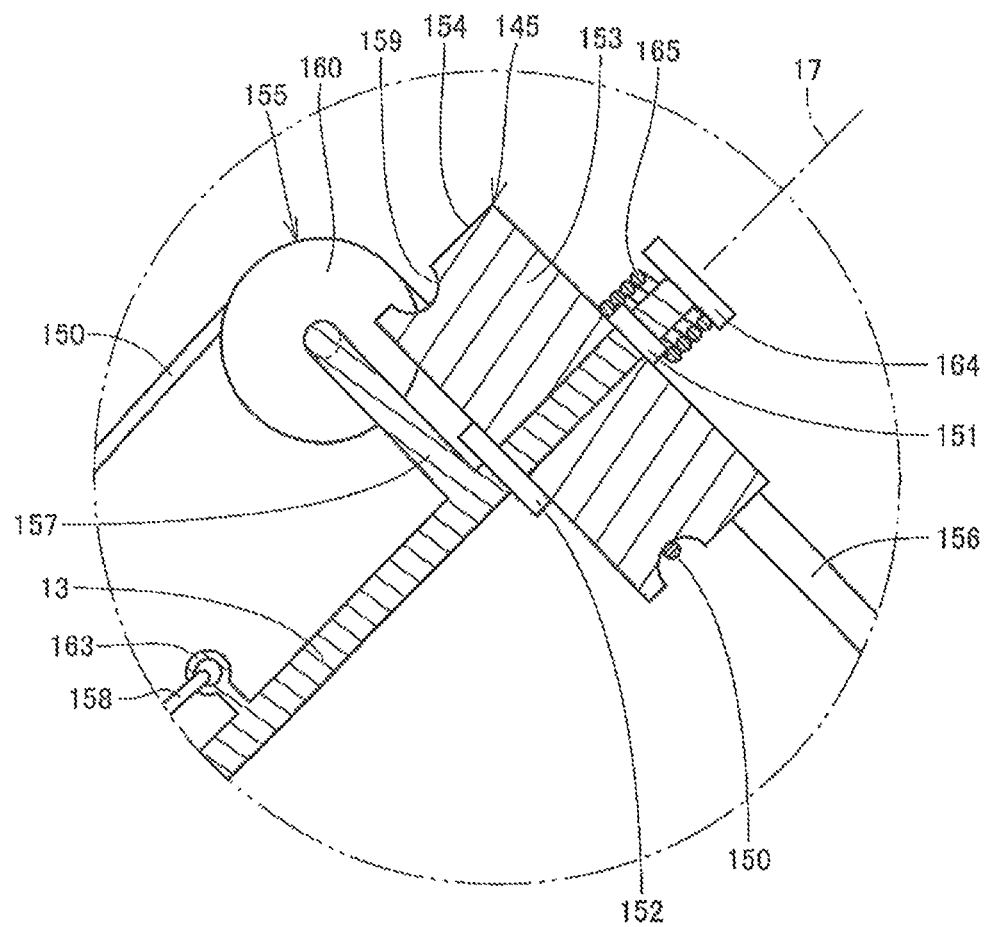
FIG. 22 is a cross-sectional enlarged view in which a part of FIG. 21 is shown in a cross section.
Figure 23:
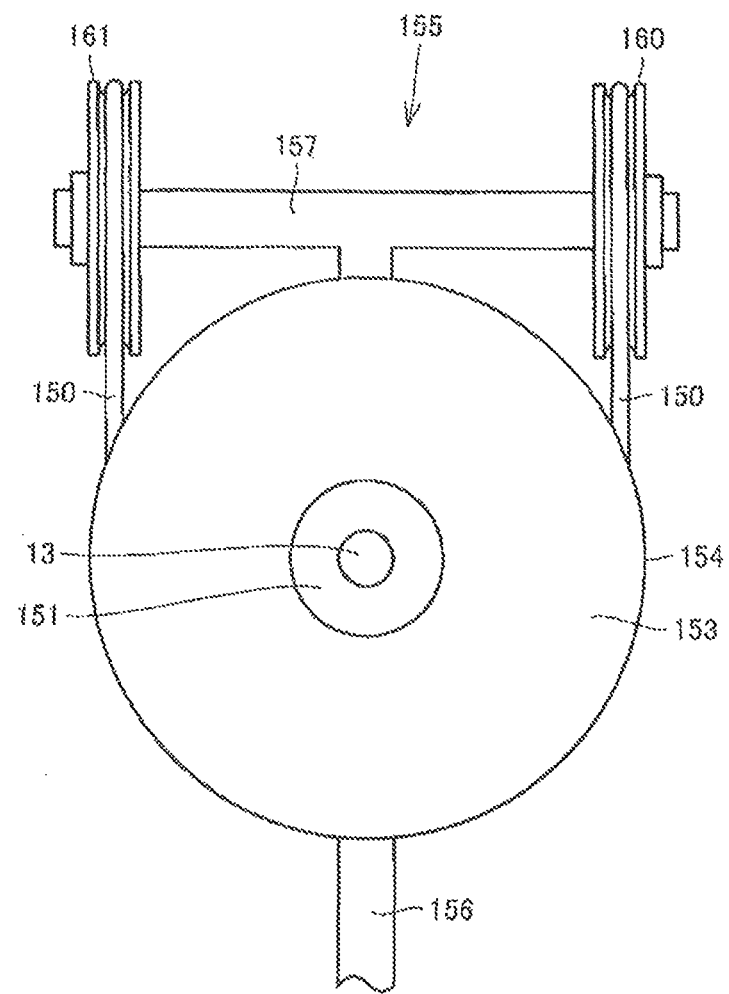
FIG. 23 is an external view when the viewing object retention device shown in FIG. 17 is seen from arrow XXIII in FIG. 17.

As one embodiment of the above-described elastic member, the torsional spring 165 will be described with reference to FIGS. 21 and 22. The torsional spring 165 according to the present embodiment is joined to the annular part 164 firmly provided in the forefront of the arm part 13 at one end, and is joined to the revolving pulley 153 at the other end. Here, when the arm part 13 is turned in either of right and left directions, by the above-described mechanism, the revolving pulley 153 relatively revolves around the arm part 13 in conjunction with the turning of the arm part 13. Consequently, a relative angle deviation is caused between the annular part 164 and the revolving pulley 153, thereby twisting the torsional spring 165. As a result, a force in a direction pulling back the revolution is applied to the revolving pulley 153 as an elastic repulsive force of the torsional spring 165. That is, this torsional spring 165 exerts the elastic repulsive force on the viewing object retention part 156 in accordance with the revolution angle displacement of the viewing object retention part 156 (the revolving pulley 153) with respect to the axis line 17 of the arm part caused with the turning of the arm part 13.

According to this configuration, providing resistance to the revolution of the viewing object retention part 156 can effectively assist the balance of the above-described moments acting on the arm part 13. That is, the arm part 13 can be caused to effectively stand still at an arbitrary turning angle.

Moreover, according to the present embodiment, a "weight" to balance the moments such as the balancer 24 is not provided separately, and the simpler and lighter configuration enables the arm part 13 to effectively stand still at an arbitrary position.

While in the present embodiment, as shown in FIG. 17, the case where the viewing object retention part 156 is provided so as to extend downward from the revolving pulley 153 has been described, the present embodiment is not limited thereto, but the viewing object retention part 156 may be provided so as to extend upward from the revolving pulley 153. In this case, the viewing object 14 retains a forefront of the viewing object retention part 156 on the upper side of the arm part 13. Even in the case of the above-described arrangement, the use of the revolving mechanism 145 enables the angle of the viewing object 14 when seen from the viewer A to be adjusted, corresponding to the direction of the face of the viewer A in conjunction with the arm part 13.

Next, referring to FIG. 29, a viewing object retention device 201 according to yet another embodiment of the present invention will be described. Members similar to those of the above-described embodiments are given the same reference numerals, and detailed descriptions thereof are omitted.

The viewing object retention device 201 according to the aforementioned yet another embodiment of the present invention is provided with a base part 142 according to the above-described embodiment, an arm part 203 that is turnably joined to the base part 142 at a rear end and extends toward a front end up to a predetermined position along an axis line 17, and a revolving mechanism 145 to displace an angle of a viewing object 14 with the turning of the arm part 13.

Here, in the present embodiment, the arm part 203 is set to be shorter than the arm part 13 according to the above-described embodiments, and a viewing object retention part 206 extending in a curved shape toward a space above a viewer A is firmly provided in a revolving pulley 153 having the front end of the arm part 203 revolvably inserted therein.

Specifically, the viewing object retention part 206 according to the present embodiment is firmly provided in the revolving pulley 153 at a rear end thereof, and extends in an upper front direction to a front end side, and curves and extends in a lower front direction at a predetermined position. An included angle of the viewing object retention part 206 is set to substantially 90°. At a front end of the viewing object retention part 206, the viewing object 14 is fixed through a fastener 206*h*.

The revolving mechanism 145 has a configuration similar to the embodiment shown in FIG. 17, and is made up of a fixed pulley 143 fixed to the base part 142, and the revolving pulley 153 having the front end of the arm part 203 revolvably inserted therein, and a joining belt 150 tightly stretched between the fixed pulley 143 and the revolving pulley 153.

In the viewing object retention device 201 according to the present embodiment, the configuration is such that the revolving mechanism 145 revolves the viewing object retention part 206 around the axis line 17 with the turning of the arm part 203. More specifically, when the arm part 203 is turned in the left direction of the viewer A, the revolving mechanism 145 revolves the viewing object retention part 206 counterclockwise when seen from the viewer A, and when the arm part 203 is turned in the right direction of the viewer A, the revolving mechanism 145 revolves the viewing object retention part 206 clockwise when seen from the viewer A. A revolution mechanism of the revolving mechanism 145 is similar to that of the above-described embodiments, and thus, a detailed description thereof is omitted.

In this manner, according to the present embodiment, the viewing object 14 can be arranged at an optimum viewing position by turning the arm part 203, whether the viewer A lies on his or her right or left side, and enables an angle of the viewing object 14 when seen from the viewer A to be automatically adjusted so as to accord with a direction of a face of the viewer. This allows the viewer A to view the viewing object 14 comfortably by the extremely easy operation regardless of a direction of the lying body.

Figure 29:
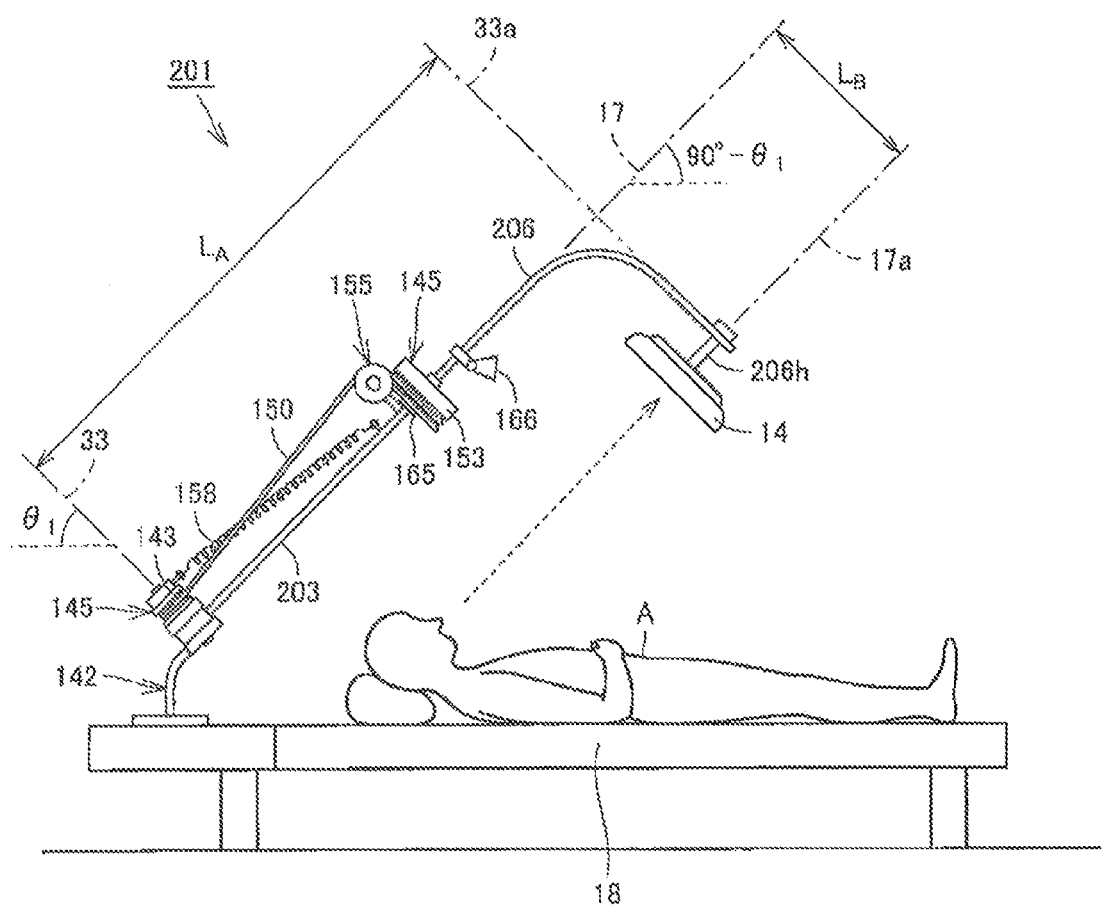
FIG. 29 is an external view showing a state where a viewer is viewing a viewing object in a supine position, using a viewing object retention device according to yet another embodiment of the present invention, corresponding to FIG. 1.

Here, as shown in FIG. 29, an axis line parallel to an axis line 33 and passing an attachment part between the viewing object 14 and the viewing object retention part 206 is an axis line 33*a*, and an axis line parallel to the axis line 17 and passing the attachment part between the viewing object 14 and the viewing object retention part 206 is an axis line 17*a*. In this case, a ratio between a distance $L_A$ between the axis line 33 and the axis line 33*a*, and a distance $L_B$ between the axis line 17 and the axis line 17*a* is desirably set to $L_A:L_B \approx 2:1$. Thereby, arranging the viewing object 14 at a position where it is easier for the lying viewer to view the viewing object 14 and balancing the above-described moments can be both advantageously satisfied.

In the present embodiment, as shown in FIG. 29, an illuminating device 166 to illuminate the viewing object 14 is attached to the viewing object retention part 206. According to this configuration, since the illuminating device 166 revolves with the viewing object 14 in conjunction with the turning of the arm part 13, it can constantly continue to illuminate the viewing object 14 regardless of a turning position of the arm part 13. This can increase convenience in the use in dark circumferences such as at night. A configuration in which the illuminating device 166 is attached to the arm part 13 and the base part 142 may be employed.

Moreover, as in the above-described embodiments, a torsional spring 165 is attached to the revolving pulley 153 to exert an elastic repulsive force on the viewing object retention part 156 in accordance with revolution angle displacement of the viewing object retention part 156 (the revolving pulley 153) with respect to the axis line 17 of the arm part, which displacement is caused with the turning of the arm part 13.

Next, referring to FIGS. 30 and 31, a viewing object retention device 171 according to yet another embodiment of the present invention will be described. Members similar to those of the above-described embodiments are given the same reference numerals, and detailed descriptions thereof are omitted.

The viewing object retention device 171 according to the aforementioned yet another embodiment of the present invention is provided with the base part 142 shown in FIG. 17, an arm part 173 that is turnably joined to the base part 142 at a rear end thereof and retains a viewing object 14 at a front end thereof, and a revolving mechanism 145 to displace an angle of the viewing object 14 with the turning of the arm part 173.

In the present embodiment, the arm part 173 is turnably joined to a turning shaft rod 21 of the base part 142 through a ring part 25 at one end portion thereof. The arm part 173 extends toward the other end portion in an upper front direction from this joining point toward a space above a viewer A, and extends along an axis line 172 bent and extending in a lower front direction at a predetermined position. At a forefront of the arm part 173, a toric ring part 175 provided with a through-hole 174 at the center is firmly provided.

A viewing object retention part 176 according to the present embodiment is a rod member, and is revolvably inserted into the through-hole 174 of the ring part 175. At one end of the viewing object retention part 176, a revolving pulley 153 making up the revolving mechanism 145 is firmly provided concentrically with the viewing object retention part 176, and detachably retains the viewing object 14 at the other end thereof. Moreover, annular parts 177 and 178 that increase diameters in an outer diameter direction from the viewing object retention part 176 are provided at a predetermined interval, and by these annular parts 177 and 178, the viewing object retention part 176 is locked in the ring part 175.

The revolving mechanism 145 has a configuration similar to the embodiment shown in FIG. 17, and is made up of a fixed pulley 143 fixed to the base part 142, and the revolving pulley 153 firmly provided at the end portion of the viewing object retention part 176, and a joining belt 150 tightly stretched between the fixed pulley 143 and the revolving pulley 153.

In this manner, in the viewing object retention device 171 according to the present embodiment, the configuration is such that the revolving mechanism 145 rotates the viewing object retention part 176 centering on the its own central axis with the turning of the arm part 173. Specifically, when the arm part 173 is turned in a left direction of the viewer A, the revolving mechanism 145 rotates the viewing object retention part 176 counterclockwise when seen from the viewer A, and when the arm part 173 is turned in a right direction of the viewer A, the revolving mechanism 145 rotates the viewing object retention part 176 clockwise when seen from the viewer A. A revolution mechanism of the revolving mechanism 145 is similar to that of the above-described embodiments, and thus, a detailed description thereof is omitted.

In this manner, according to the viewing object retention device 171 according to the present embodiment, the viewing object 14 can be arranged at an optimum viewing position by turning the arm part 173, whether the viewer A lies on his or her right or left side, and enables the angle of the viewing object 14 when seen from the viewer A to be automatically adjusted so as to accord with a direction of a face of the viewer. This allows the viewer A to view the viewing object 14 comfortably by the extremely easy operation regardless of a direction of the lying body.

Figure 30:
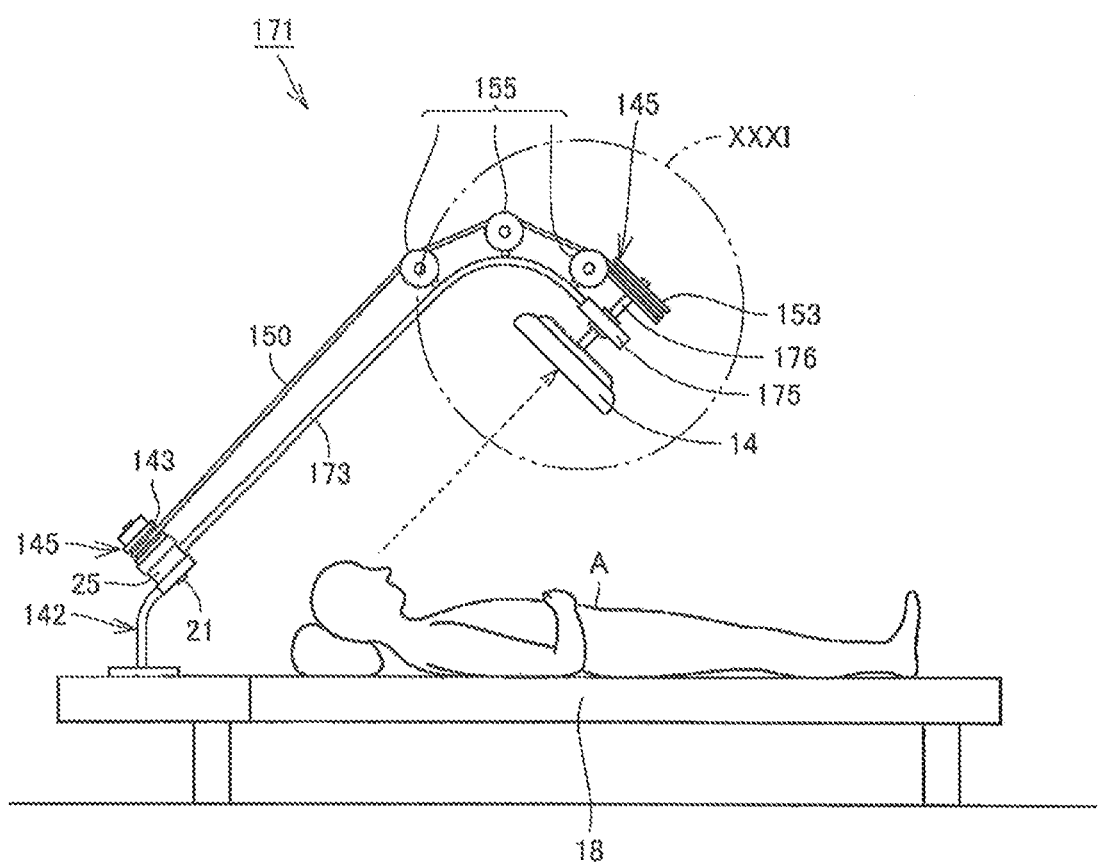
FIG. 30 is an external view showing a state where a viewer is viewing a viewing object in a supine position, using a viewing object retention device according to yet another embodiment of the present invention, corresponding to FIG. 1.
Figure 31:
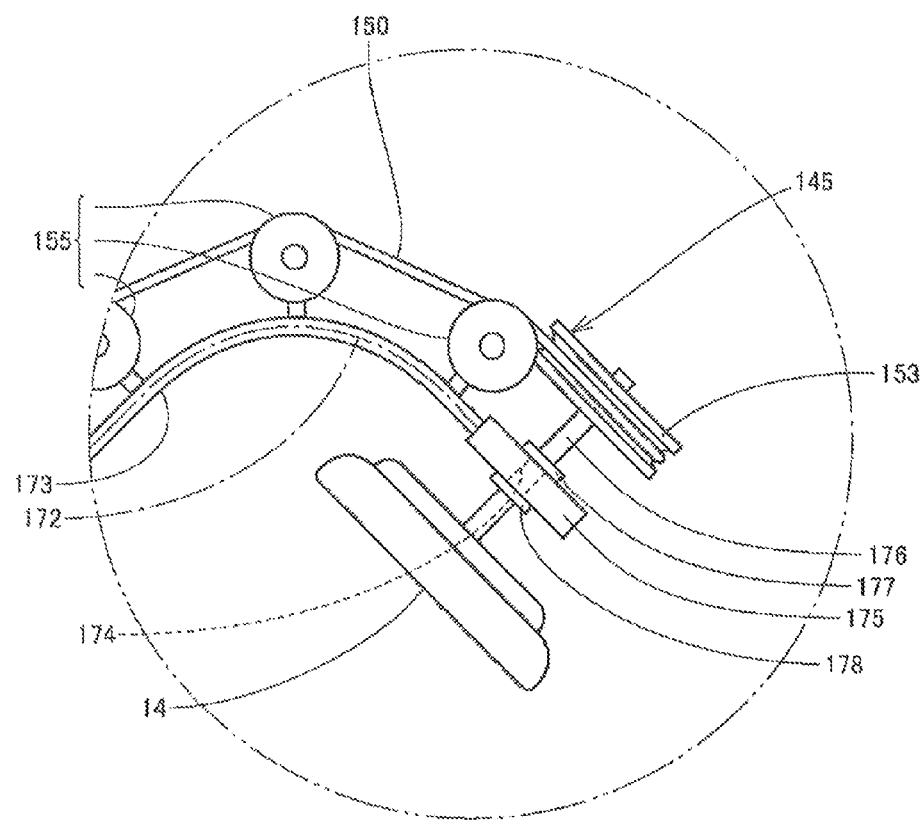
FIG. 31 is an enlarged view in which a region XXXI in FIG. 30 is enlarged.

As described, with reference to FIGS. 29 and 30, in the present invention, the arm part or the viewing object retention part is not limited to a form extending linearly, but may be in a form extending in a curved shape. That is, the present invention is not limited to the shape of the arm part or the viewing object retention part. Accordingly, the present invention is carried out not only as the embodiments shown in FIGS. 29 and 30 but also in terms of viewing easiness of the viewing object 14 and the like, the arm part or the viewing object retention part may extend anywhere, and with this, the revolving pulley 153 may be arranged at any position.

Figure 32:
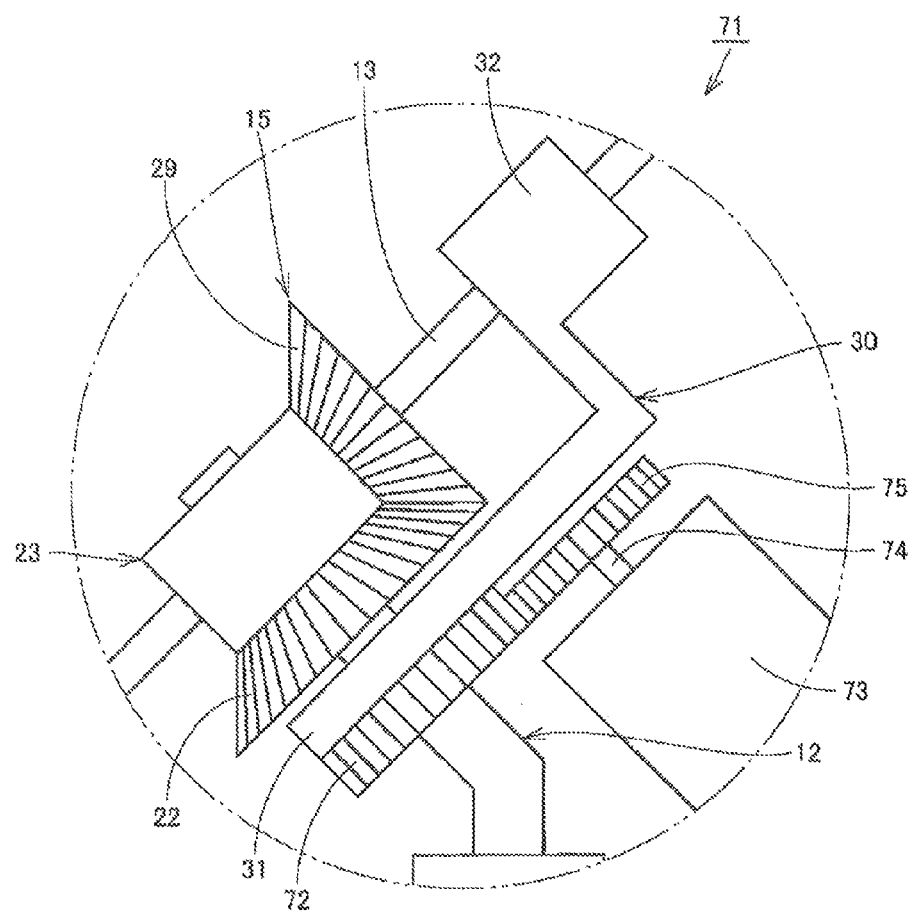
FIG. 32 is a cross-sectional enlarged view showing a viewing object retention device according to yet another embodiment of the present invention, corresponding to FIG. 3.

Next, with reference to FIG. 32, a viewing object retention device 71 according to yet another embodiment of the present invention will be described. The viewing object retention device 71 is a modification of the embodiment shown in FIGS. 1 to 7, and FIG. 32 is a view corresponding to FIG. 3. Accordingly, members similar to those of the embodiment described in FIGS. 1 to 7 are given the same reference numerals, and detailed descriptions thereof are omitted.

Referring to FIG. 32, the viewing object retention device 71 according to the aforementioned yet another embodiment of the present invention is further provided with an electric motor 73 to turn an arm part 13. At a forefront of a revolving shaft 74 of the electric motor 73, a gear 75 is firmly provided. Moreover, in a lower portion of an outer circumferential surface of the annular part 31 making up the support member 30 in the foregoing embodiment, a gear part 72 engaged with the gear 75 is formed. Since this configuration allows a revolution force by the electric motor 73 to be transmitted to the arm part 13 through the gear 75 and the support member 30, the arm part 13 can be turned by the electric motor 73.

This configuration enables the turning of the arm part 13 to be electrically controlled. That is, if the electric motor 73 can be controlled by remote operation, the viewer A can turn the arm part 13 at an arbitrary optimum viewing position by an extremely easy operation. Moreover, since the viewing object retention device 71 is provided with a revolving mechanism 15 as in the foregoing embodiment, with the turning of the arm part 13, an angle of the viewing object 14 when seen from a viewer A can be also automatically adjusted so as to accord with a direction of a face of the viewer.

Figure 33:
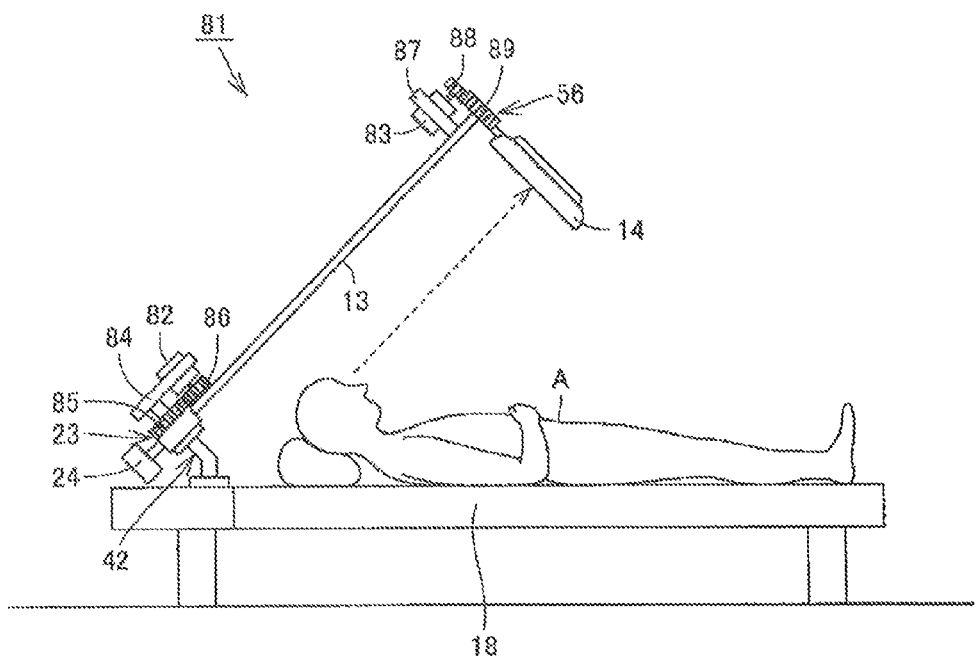
FIG. 33 is an external view showing a viewing object retention device according to yet another embodiment of the present invention, corresponding to FIG. 1.

Next, with reference to FIG. 33, a viewing object retention device 81 according to yet another embodiment of the present invention will be described. The viewing object retention device 81 is a modification of the embodiment shown in FIGS. 8 to 12, and FIG. 33 is a view corresponding to FIG. 8. Accordingly, members similar to those of the embodiment described in FIGS. 8 to 12 are given the same reference numerals, and detailed descriptions thereof are omitted.

The viewing object retention device 81 according to the aforementioned yet another embodiment of the present invention is further provided with two electric motors of an electric motor 82 to turn the arm part 13, and an electric motor 83 to turn the viewing object retention part 56. The electric motor 82 is fixed to a motor attachment part 84 provided at an upper end of a revolving shaft rod 21 making up a base part 42. Moreover, in an upper portion of an outer circumferential surface of the ring part 25 making up the balancer supporting part 23 in the above-described embodiment, a gear part 85 is formed. At a forefront of a revolving shaft of the electric motor 82, a gear 86 is attached, and this gear 86 and the gear part 85 are arranged so as to be engaged with each other. This configuration enables the arm part 13 to be turned by the electric motor 82 with the turning shaft rod 21 used as a fulcrum.

On the other hand, the electric motor 83 is fixed to a motor attachment part 87 provided at a forefront portion of the arm part 13. A gear part 89 is formed in an outer circumferential surface of the ring part 48 making up the viewing object retention part 56 in the above-described embodiment. At a forefront of a revolving shaft of the electric motor 83, a gear 88 is attached, and this gear 88 and the gear part 89 are arranged so as to be engaged with each other. This configuration enables the viewing object retention part 56 to be turned by the electric motor 83.

With this configuration, the turning of the arm part 13 and the revolution of the viewing object 14 can be electrically controlled. That is, a ratio of the numbers of revolutions of the electric motors 82 and 83 is electrically controlled, by which an angle of the viewing object 14 when seen from a viewer A can be automatically adjusted so as to accord with a direction of a face of the viewer with the turning of the arm part 13.

In the present embodiment, a configuration may be employed, in which in place of the electric motor 82, for example, an angle detection device such as a gyroscope is attached, and an angle of the turning of the arm part 13 by the viewer A is detected to control the number of revolutions of the electric motor 83, based on a detection signal thereof.

In the embodiments described with reference to FIGS. 1 to 33, as the revolving mechanism to revolve the viewing object in conjunction with the turning of the arm part, the form of using the bevel gears, the form of using the joining member that joins the fixed point and the movable point, the form of using the joining belt tightly stretched between the fixed pulley and the revolving pulley, and the form of using the electric motor(s) have been described. However, the concept of the present invention is that in order to enable the viewer to comfortably view the viewing object on whichever side he or she lies, the viewing object is revolved in conjunction with the turning of the arm part, by which the angle of the viewing object when seen from the viewer can be automatically adjusted so as to accord with the direction of the face of the viewer. Accordingly, the present invention is not limited to the above-described embodiments, but any form that automatically adjusts the angle of the viewing object in conjunction with the turning of the arm part is included in the scope of the present invention.

Moreover, while in the above-described embodiments, the viewing object retention devices that enable the viewer lying on a bed to comfortably view the viewing object have been described, the present invention is not limited thereto, but the present invention can be advantageously applied to a purpose of comfortably viewing the viewing object in a position where the viewer is sitting in a wheelchair or on a seat.

Moreover, while in the above-described embodiments, the cases where the arm part is fixed at the inclination angle of $(90-\theta)°$ with respect to the horizontal direction have been described, the present invention is not limited thereto, but a configuration may be employed, in which the inclination angle of the arm part can be arbitrarily adjusted. For example, the configuration may be such that in the base part in each of the above-described embodiments, the base rod and the turning shaft rod are joined by a joining member that can adjust an angle between these members. Furthermore, in this case, the revolving mechanism may be further provided with a revolution angle correcting mechanism that performs correction so that a maximum angle at which the revolving mechanism revolves the viewing object is $\theta°$ so as to accord with the inclination angle $(90-\theta)°$ of the arm part, which is arbitrarily adjusted.

Figure 34:
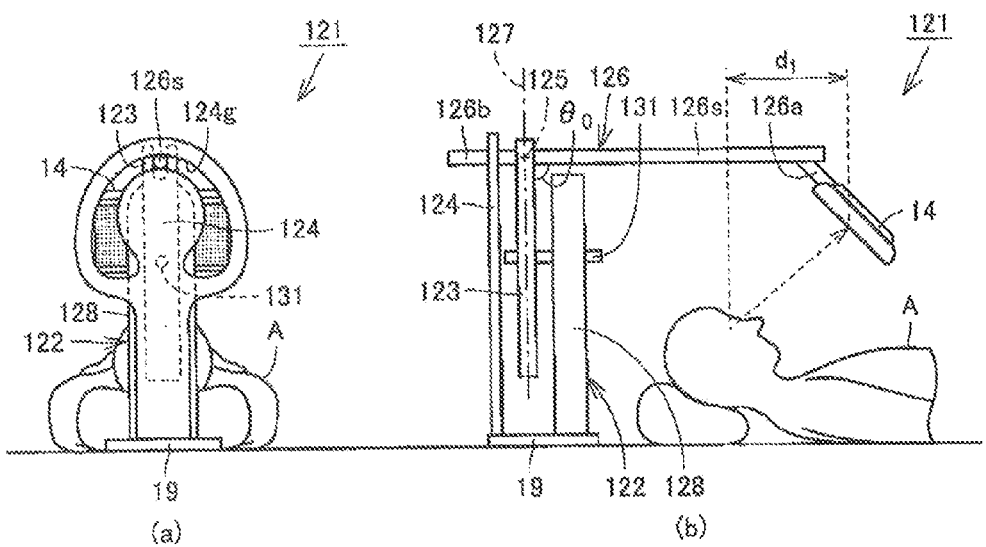
FIG. 34 is an external view showing a state where a viewer is viewing a viewing object in a supine position, using a viewing object retention device according to yet another embodiment of the present invention, in which (a) shows a view when seen from a head top portion side of the viewer, and (b) is a view when seen from a right side of the viewer.

Next, a viewing object retention device 121 according to yet another embodiment of the present invention will be described. First, with reference to FIG. 34, a configuration of the viewing object retention device 121 according to the aforementioned yet another embodiment of the present invention will be described. FIG. 34 is an external view showing a state where a viewer A is viewing a viewing object 14 in a supine position, using the viewing object retention device 121, in which (*a*) is a view when seen from a head top portion side of the viewer A, and (*b*) is a view when seen from a right side of the viewer A. Members similar to those of the above-described embodiments are given the same reference numerals, and detailed descriptions thereof are omitted.

Referring to FIG. 34, the viewing object retention device 121 according to the aforementioned yet another embodiment of the present invention is provided with a base part 122 fixed to the head top portion side of the lying viewer A, an arm part 123 turnably joined to the base part 122 through a turning shaft rod 131, an arm part 123 extending vertically upward along an axis line 127 from the joining point to a space above the viewer A, a viewing object retention part 126 that is attached to an upper end portion of the arm part 123 revolvably, centering on a revolving axis 125 to retain a viewing object 14 at a front end portion thereof, and a guide member 124 as a revolving mechanism that changes an included angle $\theta$ between the axis line 127 and the viewing object retention part 126 with the turning of the arm part 123.

The base part 122 has a pedestal part 19 fixed to the head top portion side of the viewer A and a vertical column part 128 extending vertically upward from an upper surface of the pedestal part 19. In an upper portion of the vertical column part 128, the turning shaft rod 131 is provided so as to extend substantially horizontally in a front-rear direction. The arm part 123 is turnably joined to the vertical column part 128 through this turning shaft rod 131. That is, in the present embodiment, the arm part 123 turns in the right and left directions of the viewer A in the same vertical surface, centering on the turning shaft rod 131.

The viewing object retention part 126 according to the present embodiment is made up of a retention part shaft 126*s* joined revolvably to the upper end portion of the arm part 123 through the revolving axis 125 and extending in the front-rear direction, and a viewing object attachment part 126*a* joined to a front end of the retention part shaft 126*s* revolvably in the front-rear direction. The retention part shaft 126*s* is a high-rigidity circular rod member extending on a rear side and a front side of the revolving axis 125. A rear end part 126*b* of the retention part shaft 126*s* is inserted into the guide member 124 described later. At a lower end portion of the viewing object attachment part 126*a*, the viewing object 14 is attached detachably.

The viewing object retention device 121 according to the present embodiment is provided with the guide member 124 as the revolving mechanism to appropriately revolve the viewing object 14 with the turning of the arm part 123. The guide member 124 is a plate member fixed to a rear end portion of the pedestal part 19 at a lower end thereof, and extending vertically upward from the lower end. In an upper region of the guide member 124, a guide groove 124g extending in a curved shape so as to be bilaterally symmetric with respect to the turning shaft rod 131 is provided. The rear end part 126b of the retention part shaft 126s is inserted into this guide groove 124g. When the arm part 123 is turned, the retention part shaft 126s relatively slides inside the guide groove 124g. As the arm part 123 is turning, the rear end part 126b of the retention part shaft 126s is guided by the guide groove 124g, and the retention part shaft 126s revolves relative to the arm part 123, centering on the revolving axis 125. This will be described below in detail, with reference to FIGS. 34 to 38.

Figure 35:
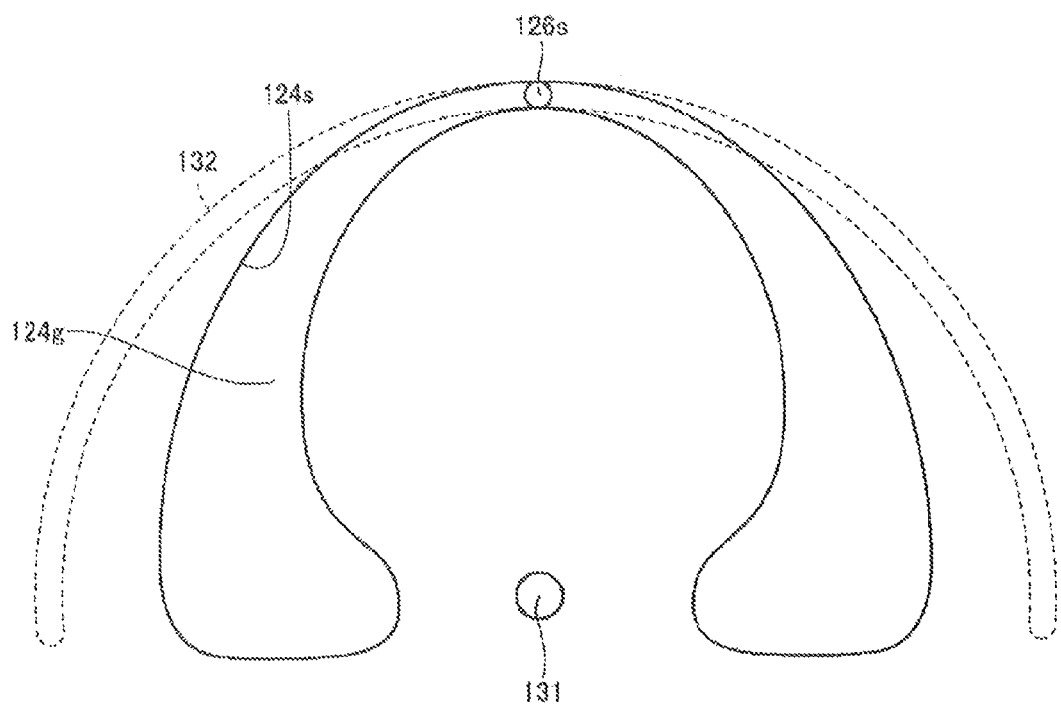
FIG. 35 is an enlarged view in which positional relationships among a retention part shaft, a guide groove, and a turning shaft rod in (a) of FIG. 34 are shown by being enlarged.
Figure 36:
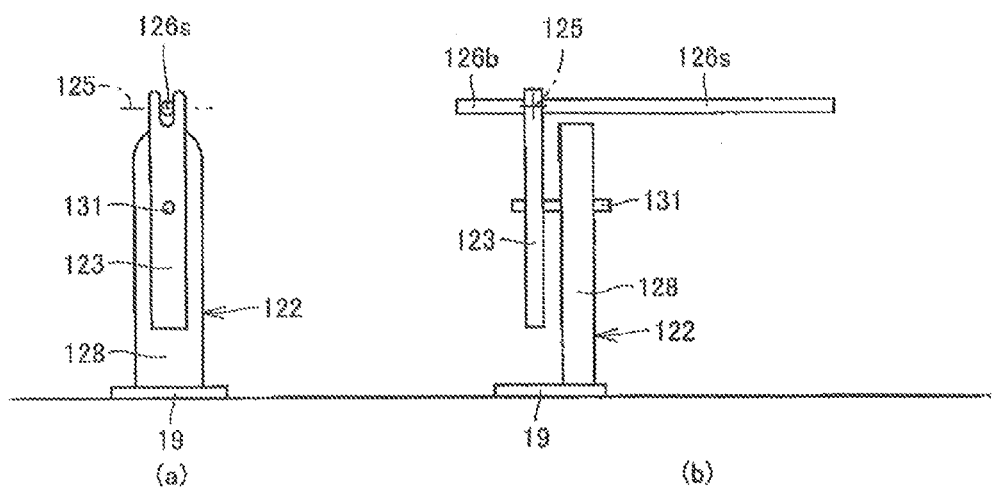
FIG. 36 is an external view showing only a part of the members of the viewing object retention device shown in FIG. 34.
Figure 37:
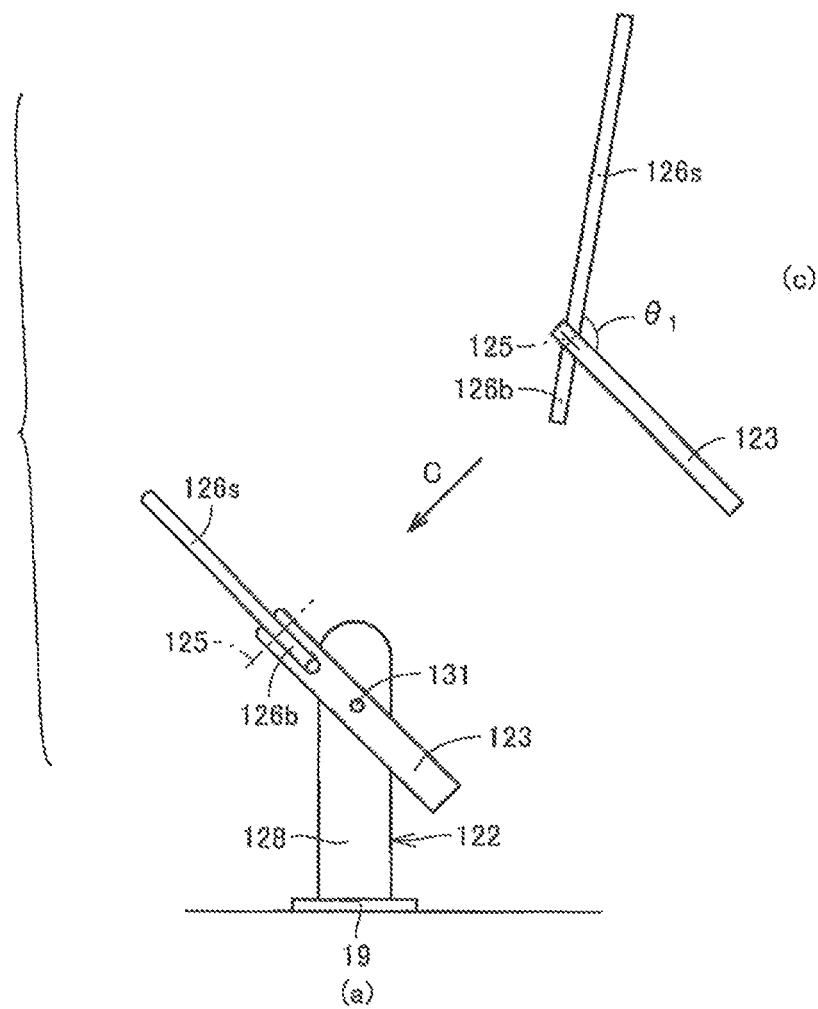
FIG. 37 is an external view showing a state where an arm part is turned by substantially 45° in a left direction of the viewer from the state shown in FIG. 36, in which (a) corresponds to (a) of FIG. 35, and (c) is a view when only the arm part and a retention part shaft are seen from a direction of arrow C in (a) of FIG. 36.
Figure 38:
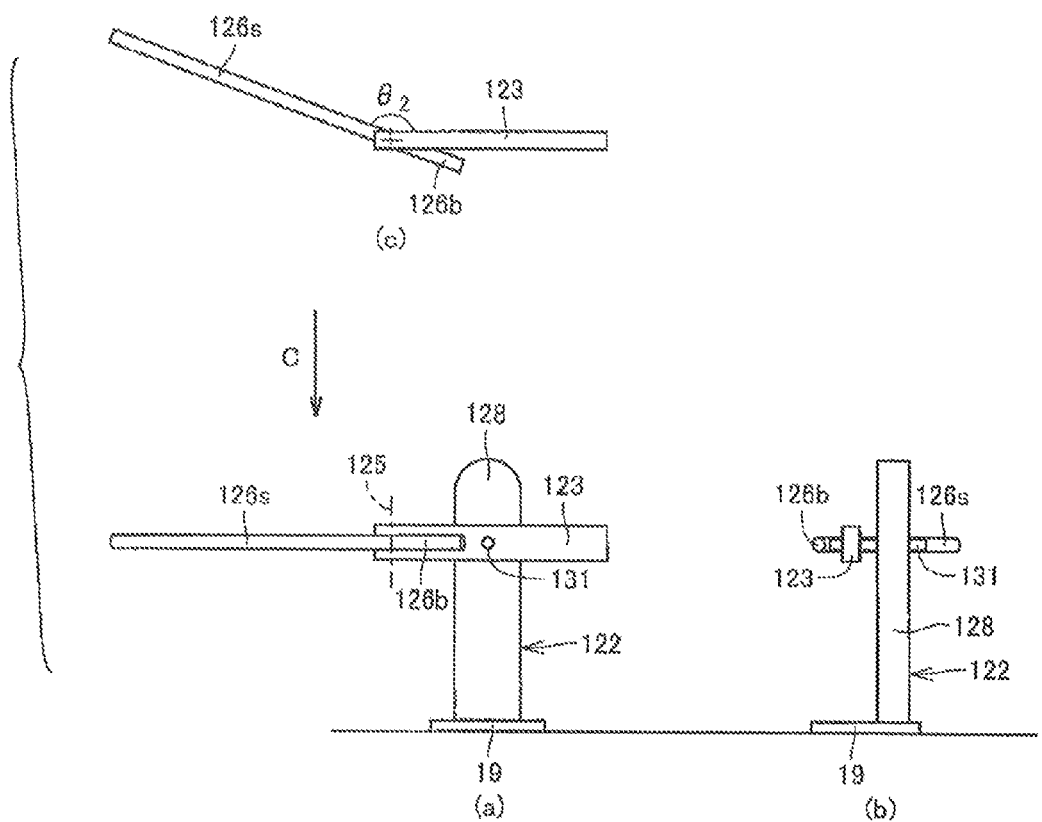
FIG. 38 is an external view showing a state where the arm part is turned in the left direction of the viewer by substantially 90° from the state shown in FIG. 36, in which (a) corresponds to (a) of FIG. 36, (b) corresponds to (b) of FIG. 36, and (c) is a view when only the arm part and the retention part shaft are seen from a direction of arrow C in (a) of FIG. 38.
Figure 39:
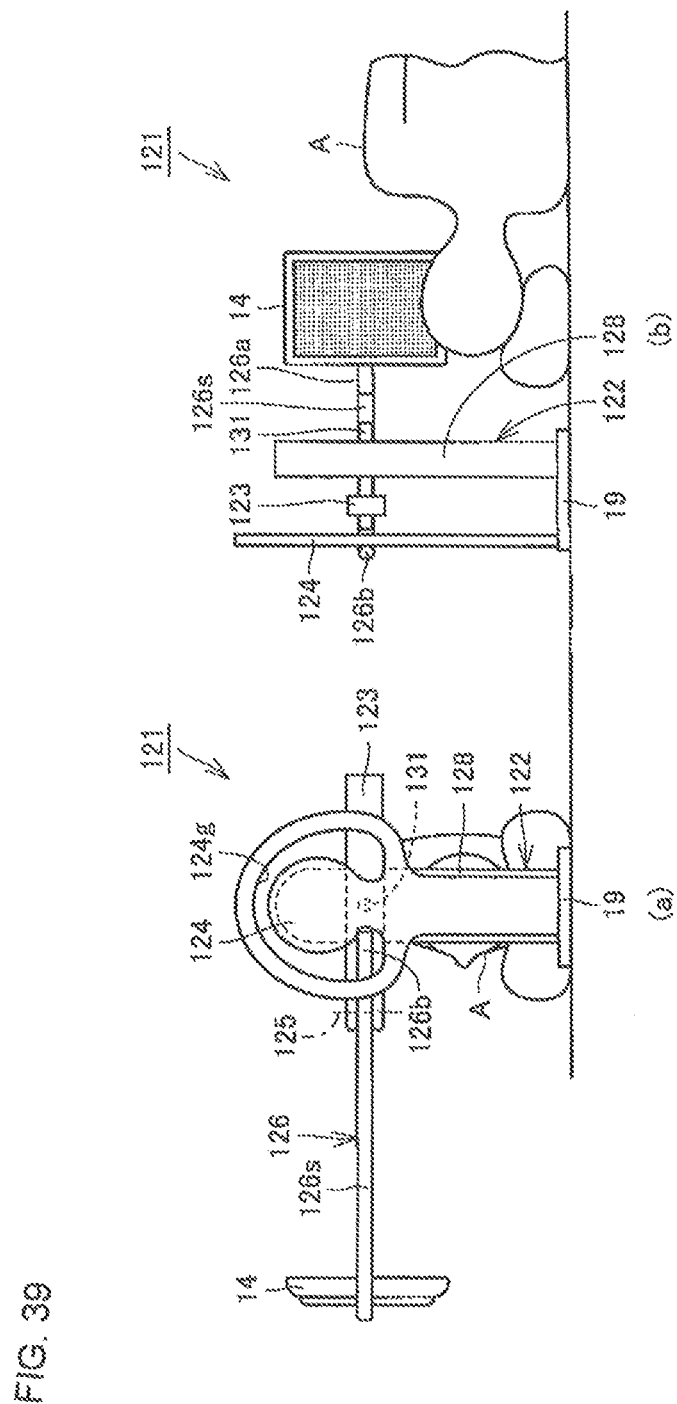
FIG. 39 is an external view showing the whole of the viewing object retention device in the state shown in FIG. 38, corresponding to FIG. 34.
Figure 40:
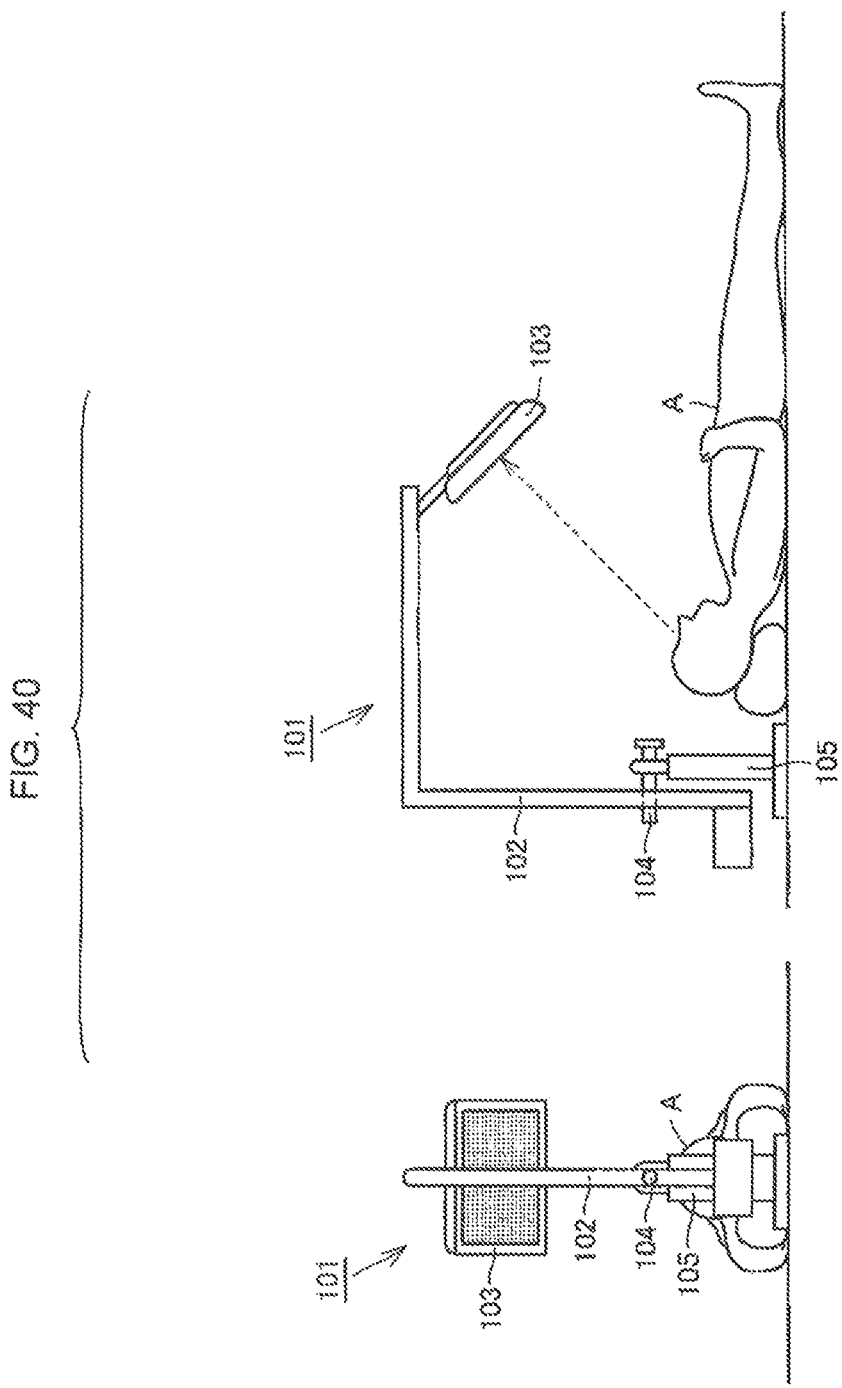
FIG. 40 is an external view when a state where a viewer is viewing an image display device in a supine position, using a retention device in the related art is seen from a head top portion side and a right side of the viewer.
Figure 41:
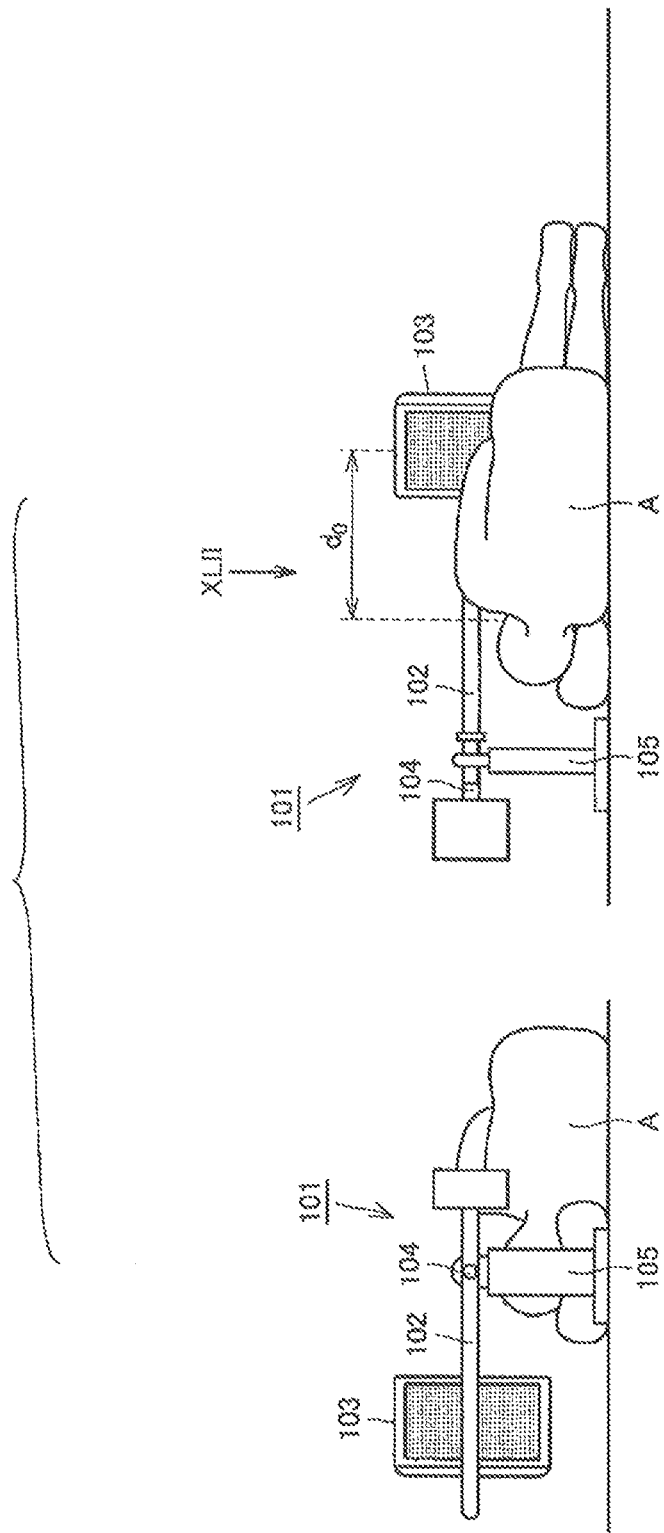
FIG. 41 is an external view showing a state where the retention device shown in FIG. 40 is turned by substantially 90° to a left side of the viewer, and the viewer is viewing the image display device in a position lying on his or her left side.
Figure 42:
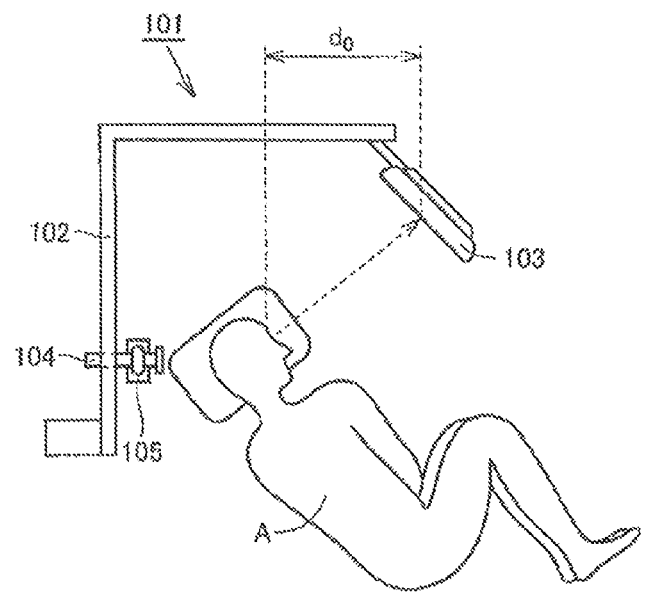
FIG. 42 is an external view when the state shown in FIG. 41 is seen from arrow XLII in FIG. 41.
Figure 43:
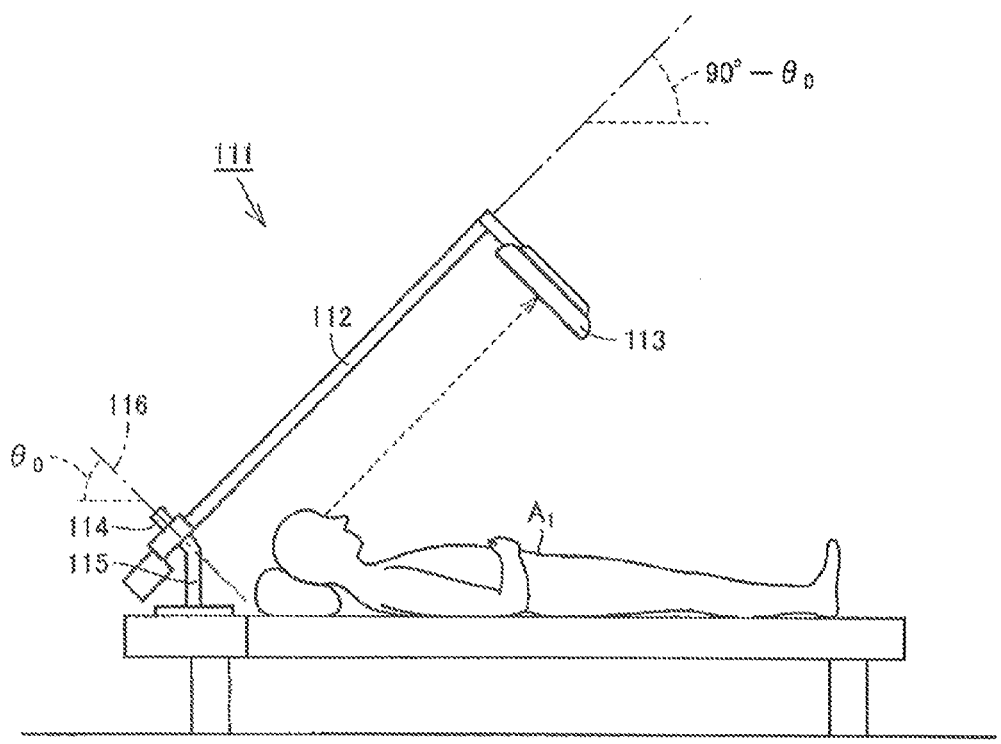
FIG. 43 is an external view when a state where a viewer is viewing an image display device in a supine position, using a retention device in the related art, is seen from a right side of the viewer.
Figure 44:
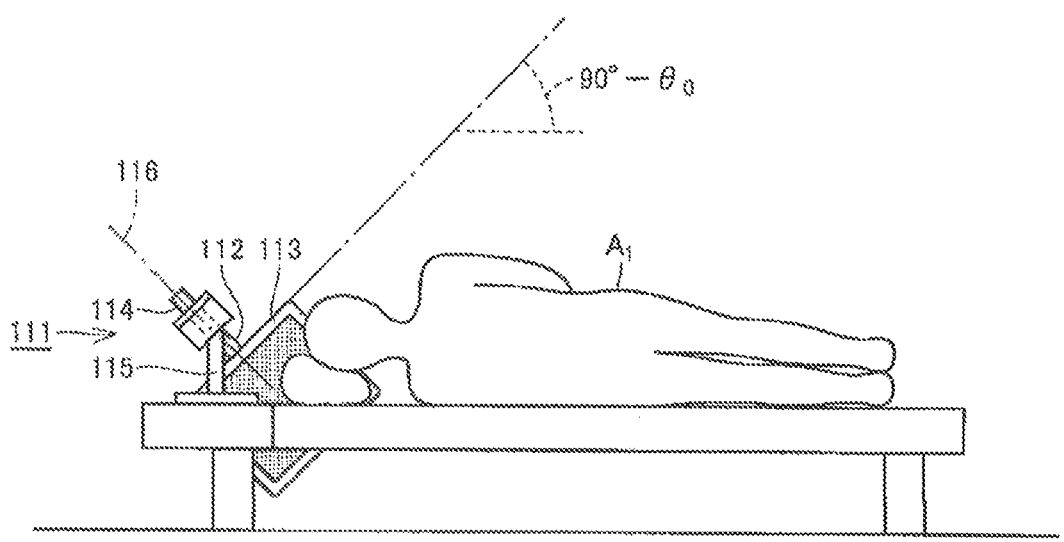
FIG. 44 is an external view showing a state where the retention device shown in FIG. 43 is turned by substantially 90° to a left side of the viewer, and the viewer is viewing the image display device in a position lying on his or her left side.

FIG. 35 is an enlarged view in which positional relationships among the retention part shaft 126s, the guide groove 124g, and the turning shaft rod 131 in (a) of FIG. 34 are shown by being enlarged. FIG. 36 is an external view showing a part of the members of the viewing object retention device 121 shown in FIG. 34. FIG. 37 is an external view showing a state where the arm part 123 is turned by substantially 45° in a left direction of the viewer A from a state shown in FIG. 36, in which (a) corresponds to (a) of FIG. 36, and (c) is a view when only the arm part 123 and the retention part shaft 126s are seen from a direction of arrow C in (a) of FIG. 37. FIG. 38 is an external view showing a state where the arm part 123 is turned in the left direction of the viewer A by substantially 90° from the state shown in FIG. 36, in which (a) corresponds to (a) of FIG. 36, (b) corresponds to (b) of FIG. 36, and (c) is a view when only the arm part 123 and the retention part shaft 126s are seen from a direction of arrow C in (a) of FIG. 38. In FIGS. 36 to 38, in terms of easiness of understanding, only the base part 122, the arm part 123, and the retention part shaft 126s are shown. FIG. 39 is an external view showing the whole of the viewing object retention device 121 in the state shown in FIG. 38, corresponding to FIG. 34.

Referring to FIGS. 34 to 39, unlike the foregoing embodiments, the revolving mechanism according to the present embodiment has a function of controlling the included angle $\theta$ between the retention part shaft 126s and the arm part 123 in conjunction with the turning of the arm part 123. As shown in FIG. 34, in the state where the turning angle of the arm part 123 is 0°, the retention part shaft 126s is locked in the guide groove 124g orthogonally to the arm part 123. That is, $\theta_0$ in (b) of FIG. 34 is substantially 90°.

Here, as shown in FIG. 35, the guide groove 124g provided in the guide member 124 is defined by a wall surface 124s having a smaller curvature radium than a revolution trajectory of the retention part shaft 126s centering on the turning shaft rod 131. More specifically, in FIG. 35, when in the state where the retention part shaft 126s is orthogonal to the arm part 123, that is, in the state where the included angle $\theta_0=90°$ is maintained, the retention part shaft 126s revolves centering on the turning shaft rod 131, the retention part shaft 126s follows a trajectory indicated by a dashed line 132. In contrast, the wall surface 124s, which is the wall surface defining the guide groove 124g and abuts on the rear end part 126b of the retention part shaft 126s during the turning of the arm part 123 has the smaller curvature radius with the respect to the turning shaft rod 131 than the trajectory indicated by the dashed line 132. Therefore, as the arm part 123 is being turned leftward from the state shown in FIG. 36, the rear end part 126b of the retention part shaft 126s inserted into the guide groove 124g is relatively pushed down toward the turning shaft rod 131 side. As a result, the retention part shaft 126s relatively revolves centering on the revolving axis 125 with respect to the arm part 123. This increases an included angle $\theta_1$ between the retention part shaft 126s and the arm part 123 ($\theta_1 > \theta_0 = 90°$), as shown in FIG. 37.

In this manner, in the present embodiment, the configuration is such that the retention part shaft 126s is guided by the guide groove 124g formed as described above so that as the arm part 123 is being turned, the included angle between the retention part shaft 126s and the arm part 123 becomes larger.

When the arm part 123 is turned leftward by 90° from the state shown in FIG. 36 to the state shown in FIG. 38, the retention part shaft 126s relatively revolves centering on the revolving axis 125 with this, and the included angle between the retention part shaft 126s and the arm part 123 becomes $\theta_2$ ($\theta_2 > \theta_1 > \theta_0 = 90°$). Here, as shown in (b) of FIG. 39, this included angle $\theta_2$ is set appropriately so that a position of a head portion in the front-rear direction of the viewer A, and a position in the front-rear direction of the viewing object 14 substantially coincide with each other. That is, the guide member 124 is configured so that the retention part shaft 126s is relatively revolved to reach the included angle $\theta_2$ at which the viewing object 14 is arranged substantially in front of a sight line of the viewer lying on his or her left side. Moreover, in this case, as shown in (b) FIG. 39, the viewing object 14 is retained substantially in front of the viewer A in the state lying on its side so as to accord with the direction of the face of the viewer A inclined almost horizontally. This enables the viewer A to comfortably view the viewing object 14 in the state lying on his or her left side.

That is, in the viewing object retention device 121 according to the present embodiment, as shown in FIG. 34, the viewing object 14 retained on the front side at a distance $d_1$ from the head portion of the viewer A is gradually approaching the position in the front-rear direction of the head portion of the viewer A with turning of the arm part 123, and in the state where the arm part 123 is turned by substantially 90° from the vertical direction, the viewing object 14 can be arranged substantially in front of the sight line of the viewer lying on his or her side. That is, whether the viewer A lies on his or her right or left side, the viewing object 14 can be constantly arranged at an optimum viewing position by turning the arm part 123. Accordingly, the viewer A can view the viewing object 14 comfortably by the extremely easy operation regardless of the direction of the lying body.

Moreover, in the present embodiment, since the revolving mechanism that brings about the above-described action can be realized by the member having the simple configuration such as the guide member 124, a manufacturing cost of the viewing object retention device 121 can be reduced.

The viewing object retention device 121 may be further provided with a mechanism that appropriately controls an inclination angle of the viewing object attachment part 126a with respect to the retention part shaft 126s so as to accord with the sight line of the viewer A with the turning of the arm part 123. As the mechanism that performs the above-described control, for example, the mechanism shown in FIGS. 13 to 15 or in FIGS. 24 to 26 may be applied, or the electric motors may be used, as shown in FIG. 33.

Moreover, while in the above-described embodiment, the case has been described, where the revolving mechanism is configured so as to increase the included angle between the retention part shaft and the arm part as the arm part is being turned, the present invention is not limited thereto, for example, it may be configured to reduce the included angle between the retention part shaft and the arm part, as the arm part is being turned. This can be realized, for example, by vertically flipping the shape of the guide groove shown in FIG. 34.

Moreover, while in the above-described embodiment, the case has been described, where the retention part shaft and the arm part are orthogonal to each other in the state where the turning angle of the arm part is 0°, that is, where the above-described included angle $\theta_0$ is configured so as to be substantially 90°, the present invention is not limited thereto, but the retention part shaft and the arm part may be joined so as to form an arbitrary angle. Moreover, while the case where the arm part extends vertically has been described, the present invention is not limited thereto, and the arm part may be provided so as to be inclined at an arbitrary angle with respect to the horizontal direction.

In the above-described embodiment, the case has been described, where the revolving mechanism that revolves the retention part shaft relatively to the axis line of the arm part in conjunction with the turning of the arm part to appropriately control the included angle between the retention part shaft and the arm part is made up of the guide member provided with the guide groove. However, a concept of the present invention is that in order to enable the viewing object to be arranged substantially in front of the sight line of the viewer who views the viewing object, on whichever side the viewer lies, as the arm part is being turned, the viewing object retention part is revolved relatively to the axis line of the arm part so that the position in the front-rear direction of the viewing object is approaching the position in the front-rear direction of the head portion of the viewer. Accordingly, the present invention is not limited to the above-described embodiment, any form is included in the scope of the present invention, as long as it automatically adjusts the angle of the viewing object retention part with respect to the arm part in conjunction with the turning of the arm part. Moreover, a configuration may be employed, for example, in which as the arm part is being turned, the retention part shaft slides with respect to the arm part, by which the position in the front-rear direction of the viewing object is approaching the position in the front-rear direction of the head portion of the viewer.

While in each of the embodiments shown in FIGS. 1 to 39, the case where the base part is fixed to the head top portion side of the user has been described, the present invention is not limited thereto. That is, the base part may be installed in any place around the user. For example, the base part can be installed on a side of the viewer and the arm part having a plurality of joints and the revolving mechanism can be combined to configure the viewing retention device having the above-described function.

Moreover, examples of the viewing object applicable to the viewing object retention device according to the present invention include various materials that the viewer enjoys viewing, which are an image device such as an LCD; various types of mobile terminal devices such as a cellular phone, a laptop PC, and a tablet terminal device, which has become popular in recent years; a reading material such as a book and a magazine; and a projection type image device such as a projector.

Moreover, in the viewing object retention device, in order for the lying viewer to operate the viewing object more easily, a configuration may be employed, in which an operation device retention member that retains an operation device of the viewing object is further provided in the vicinity of the viewer. As the operation device of the viewing object, for example, a keyboard for PC, a remote controller for television, a microphone for voice input, a cellular phone, or a multifunctional smart phone having the operation function or the like is considered. By an operation device retention member, the above-described operation device can be arranged in the vicinity of the lying viewer, by which the viewer can operate the viewing object comfortably while lying.

As described above, while the embodiments of the present invention have been described with reference to the drawings, the present invention is not limited to the illustrated embodiments. Various amendments and modifications can be made to the illustrated embodiments in the identical scope of the present invention or in the equivalent scope.

Industrial Applicability

Since the present invention is to provide a retention device that retains a viewing object to enable a viewer to comfortably view the viewing object while lying or sitting, it is advantageously utilized, for example, in a medical or care field.

Reference Signs List 11, 41, 71, 81, 121, 141, 171, 201: viewing object retention device
12, 42, 105, 115, 122, 142: base part
13, 102, 112, 123, 173, 203: arm part
14: viewing object
15, 45, 145: revolving mechanism
16, 56, 126, 156, 176, 206: viewing object retention part
17, 17a, 33, 33a, 116, 127, 132, 172: line
18: bed
19: pedestal part
20: base rod
21, 131: turning shaft rod
22: base-side bevel gear
23: balancer supporting part
24: balancer
25, 48, 175: ring part
26: rod member
27, 28, 50, 52, 53, 174: through-hole
29: arm-side bevel gear
30: support member
31, 32, 43, 57, 146, 147, 148, 151, 152, 164, 177, 178: annular part
44: disk part
44s: upper surface
46, 47, 66, 67: projected part
49: retention member
51: relay member
54: first joining member
55: second joining member
58: front surface
72, 85, 89: gear part
73, 82, 83: electric motor
74, 125: revolving shaft
75, 86, 88: gear
84, 87 motor attachment part
101, 111: retention device
103, 113: image display device
104, 114: turning shaft
124: guide member
124g, 149, 159: guide groove
126s: retention part shaft
126a: viewing object attachment part
126b: rear end part
128: vertical column part
143: fixed pulley
144, 154: outer circumferential surface
150: joining belt
153: revolving pulley
155: belt guide
157: belt guide member

158: arm retention spring
160, 161: guide pulley
162, 163: spring attachment part
165: torsional spring
166: illuminating device
206h: fastener

The invention claimed is:

1. A viewing object retention device to retain a viewing object to enable a viewer to view the viewing object, the viewing object comprising one or more of an image display device, a reading material, and an image substrate while the viewer is in a lying position or in a sitting position, the device comprising:
  a base part;
  an arm part that is turnably joined to the base part at one end portion of the arm part through an axis having an angle of $(90°-\theta_A)$ with respect to a horizontal direction, and extends to an other end portion of the arm part along an axis line having an angle of $\theta_A$ with respect to the horizontal direction from a joining point at which the arm part and the base part are turnably joined toward a space above the viewer;
  a viewing object retention part that is located at the other end portion of the arm part to retain the viewing object; and
  a revolving mechanism that displaces the viewing object retention part angularly with respect to the axis line with the turning of the arm part with the joining point used as a fulcrum.

2. The viewing object retention device according to claim 1,
  wherein the revolving mechanism revolves the viewing object retention part counterclockwise when seen from the viewer when the arm part turns in a left direction of the viewer, and revolves the viewing object retention part clockwise when seen from the viewer when the arm part turns in a right direction of the viewer.

3. The viewing object retention device according to claim 1,
  wherein the revolving mechanism revolves the viewing object retention part around the axis line with the turning of the arm part.

4. The viewing object retention device according to claim 1,
  wherein the revolving mechanism has a first abutting member provided in the base part, and
  a second abutting member that is provided in the arm part and abuts on the first abutting member relatively revolvably, and
  revolves the viewing object retention part around the axis line through the first abutting member and the second abutting member with the turning of the arm part.

5. The viewing object retention device according to claim 4,
  wherein the first abutting member comprises a first bevel gear firmly provided in the base part, and
  the second abutting member comprises a second bevel gear firmly provided in the arm part so as to be engaged with the first bevel gear.

6. The viewing object retention device according to claim 5,
  wherein if an angle of the arm part with respect to the horizontal direction is $\theta_A$, the number of teeth of the first gear is $G_1$, and the number of teeth of the second bevel gear is $G_2$, $(90°-\theta_A)/90°\approx G_1/G_2$ is satisfied.

7. The viewing object retention device according to claim 1,
  wherein the viewing object retention part is revolvably supported at the other end portion of the arm part,
  the revolving mechanism has a joining member that joins a fixed point on the base part and a movable point at a predetermined position on the viewing object retention part, and
  the revolving mechanism revolves the viewing object retention part through the joining member with the turning of the arm part.

8. The viewing object retention device according to claim 7,
  wherein the revolving mechanism has a fixed member fixed to the base part,
  a revolving member provided in the viewing object retention part, and
  the joining member tightly stretched relatively unmovably between the fixed member and the revolving member.

9. The viewing object retention device according to claim 8,
  wherein the fixed member and the revolving member are circular, and
  the joining member is tightly stretched around outer circumferential surfaces of the fixed member and the revolving member.

10. The viewing object retention device according to claim 9,
  wherein if an angle of the arm part with respect to the horizontal direction is $\theta_A$, a diameter of the fixed member is $R_1$, and a diameter of the revolving member is $R_2$, $(90°-\theta_A)/90°\approx R_1/R_2$ is satisfied.

11. The viewing object retention device according to claim 1,
  wherein the viewing object retention part is revolvably supported at the other end portion of the arm part, and
  the revolving mechanism further has arm part turning means for electrically turning the arm part,
  viewing object retention part turning means for electrically revolving the viewing object retention part, and
  control means for controlling the arm part turning means and the viewing object retention part revolving means so that the viewing object retention part revolves with the turning of the arm part.

12. The viewing object retention device according to claim 1,
  wherein an angle between the viewing object retention part and the axis line of the arm part is set to a range of 80° to 100°.

13. The viewing object retention device according to claim 1,
  wherein the arm part extends from the joining point toward the space above the viewer at an angle ranging 40° to 70° with respect to the horizontal direction.

14. The viewing object retention device according to claim 1,
  wherein the revolving mechanism changes an included angle between the axis line and the viewing object retention part with the turning of the arm part.

15. The viewing object retention device according to claim 14,
  wherein the revolving mechanism further has a guide member including a guide groove that receives a part of the viewing object retention part to control the included angle with the turning of the arm part.

16. The viewing object retention device according to claim 1 further comprising an elastic member that exerts an elastic force in accordance with the turning displacement of the arm part on the arm part or the viewing object retention part.

17. The viewing object retention device according to claim 16,
- wherein the elastic member is provided on the viewing object retention part side, and
- exerts the elastic force on the viewing object retention part in accordance with the angle displacement of the viewing object retention part with respect to the axis line, the displacement being caused with the turning of the arm part.

* * * * *